(12) United States Patent
Dale et al.

(10) Patent No.: US 9,403,095 B2
(45) Date of Patent: Aug. 2, 2016

(54) APPARATUSES, METHODS AND SYSTEMS FOR AN ONLINE GAME MANAGER

(71) Applicant: Zynga Inc., San Francisco, CA (US)

(72) Inventors: Scott Dale, San Francisco, CA (US); Jason McGuirk, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 223 days.

(21) Appl. No.: 13/975,115

(22) Filed: Aug. 23, 2013

(65) Prior Publication Data

US 2013/0344965 A1    Dec. 26, 2013

Related U.S. Application Data

(63) Continuation of application No. 12/894,280, filed on Sep. 30, 2010, now Pat. No. 8,556,724.

(60) Provisional application No. 61/247,538, filed on Sep. 30, 2009.

(51) Int. Cl.
| | |
|---|---|
| G06F 17/00 | (2006.01) |
| A63F 13/358 | (2014.01) |
| A63F 13/46 | (2014.01) |
| A63F 13/798 | (2014.01) |
| H04L 29/08 | (2006.01) |
| A63F 13/30 | (2014.01) |
| A63F 13/352 | (2014.01) |
| H04L 29/06 | (2006.01) |

(52) U.S. Cl.
CPC .............. *A63F 13/358* (2014.09); *A63F 13/12* (2013.01); *A63F 13/352* (2014.09); *A63F 13/46* (2014.09); *A63F 13/798* (2014.09); *H04L 67/1002* (2013.01); *A63F 2300/556* (2013.01); *H04L 67/38* (2013.01)

(58) Field of Classification Search
USPC ........................ 463/40–42; 709/226; 718/105
See application file for complete search history.

(56) References Cited

U.S. PATENT DOCUMENTS

| 8,622,828 B1 * | 1/2014 | Harrington ..................... 463/31 |
| 2003/0069903 A1* | 4/2003 | Gupta et al. ................... 707/204 |
| 2007/0082738 A1* | 4/2007 | Fickie et al. ................... 463/42 |

* cited by examiner

*Primary Examiner* — Ronald Laneau
(74) *Attorney, Agent, or Firm* — Martine Penilla Group, LLP

(57) ABSTRACT

The APPARATUSES, METHODS AND SYSTEMS FOR AN ONLINE GAME MANAGER ("OGM") transform user social graph and online behavioral pattern data inputs via OGM components into optimized server computational load reports. In one embodiment, the OGM may process a user server migration request for a user by obtaining user social graph data identifying co-users, and social activity pattern data associated with the user and the co-users. The OGM may also obtain server load indices of servers associated with the co-users, and server load analysis rules. By analyzing the server load indices using the server load analysis rules, the OGM may identify a subset of the servers as non-overloaded transfer candidate servers. The OGM may calculate transfer candidate server scores for the non-overloaded transfer candidate servers using the user social graph data and the social activity pattern data.

19 Claims, 24 Drawing Sheets

EXAMPLE ONLINE GAME MANAGER TOPOLOGY

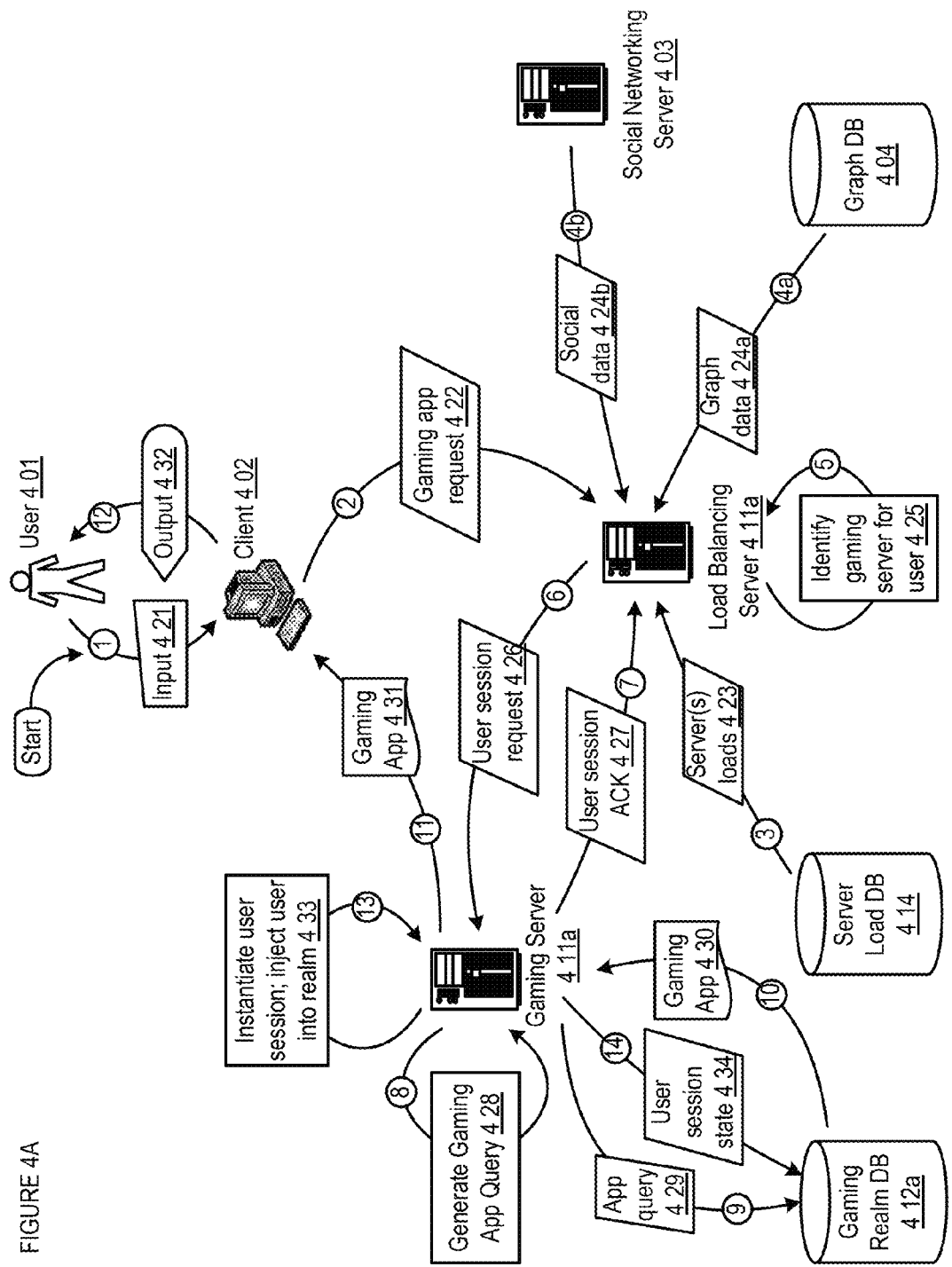

EXAMPLE ONLINE GAME MANAGER DATA FLOW

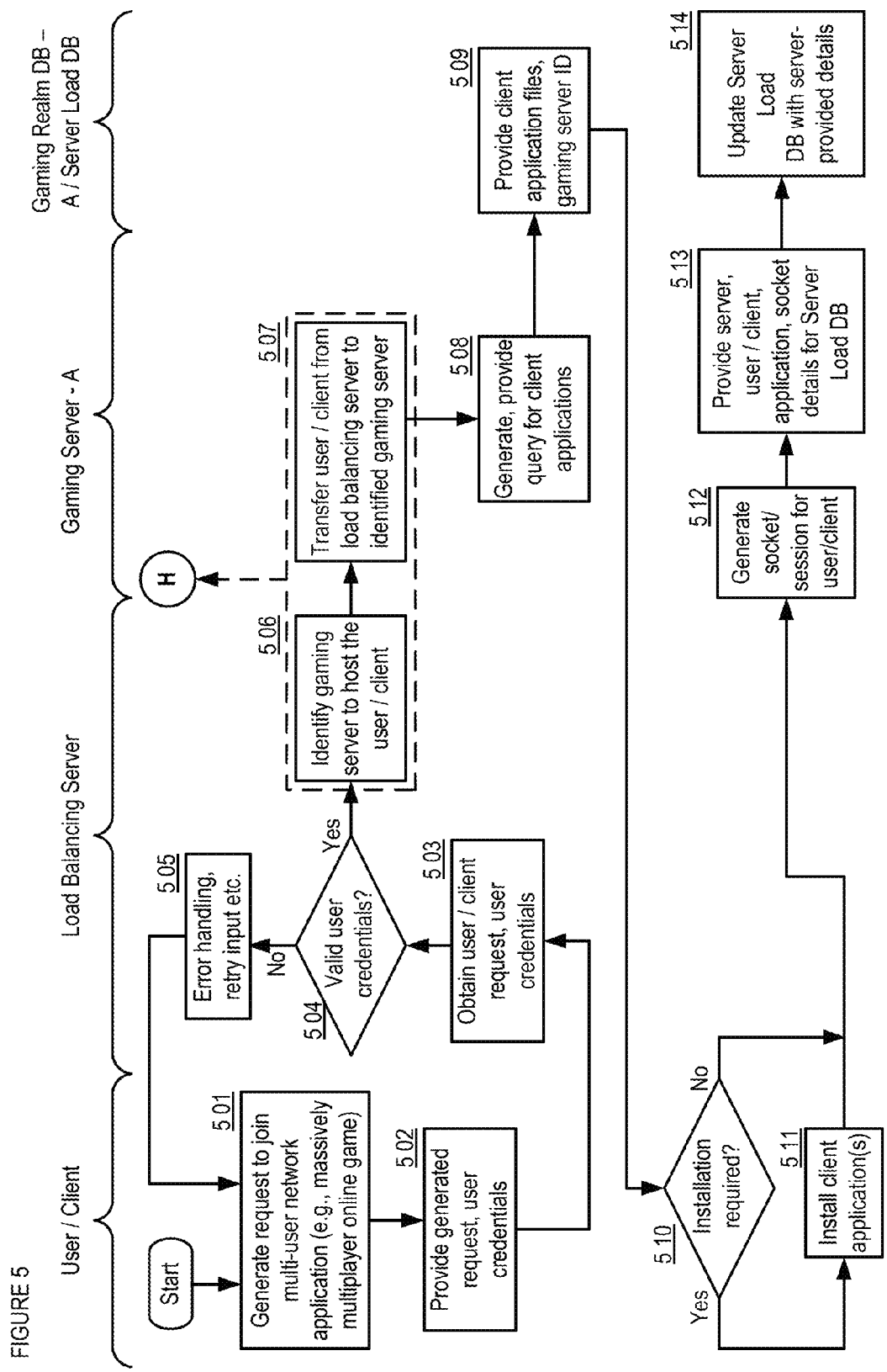

EXAMPLE USER GAMING INTERACTION (UGI) COMPONENT 600

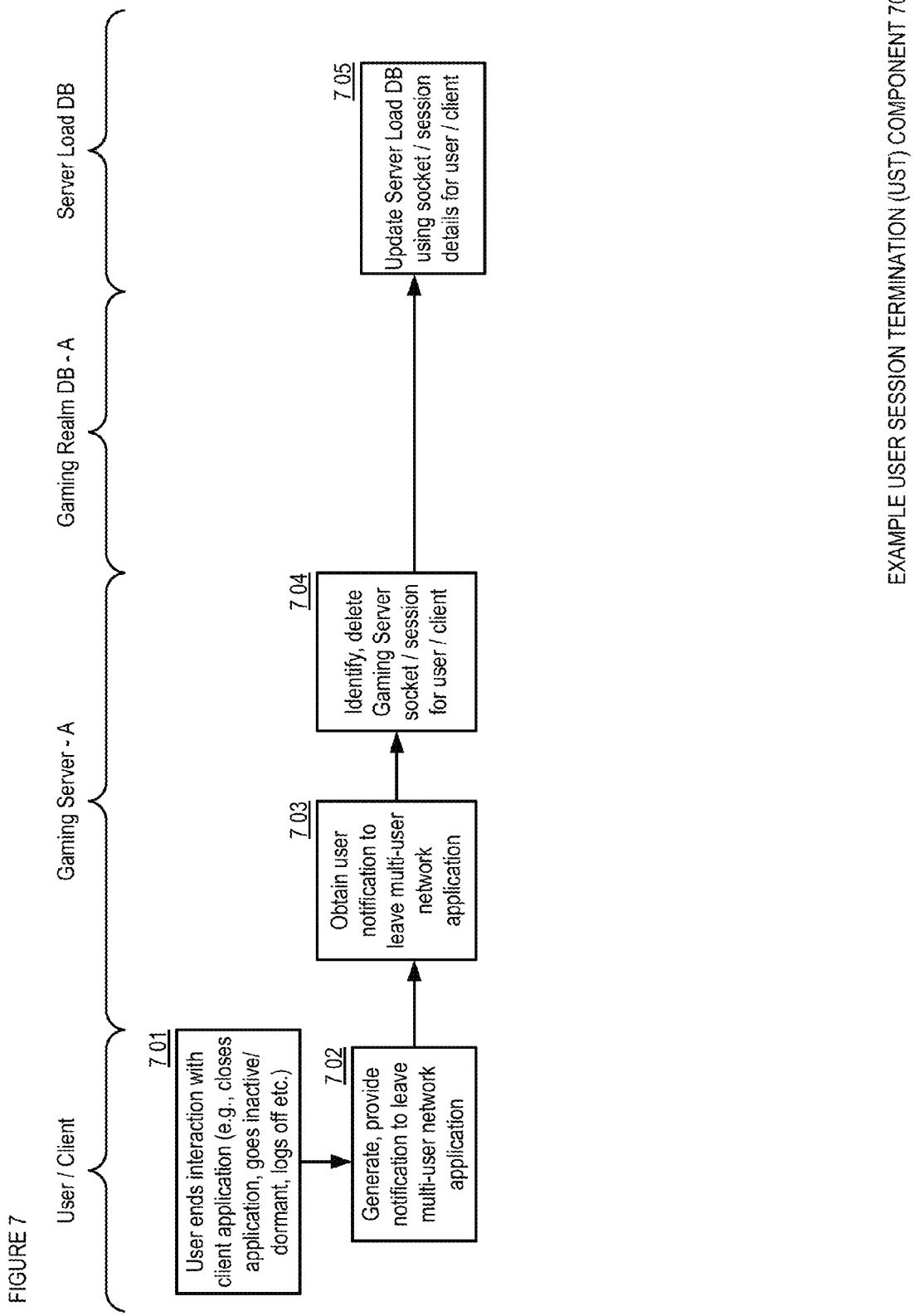

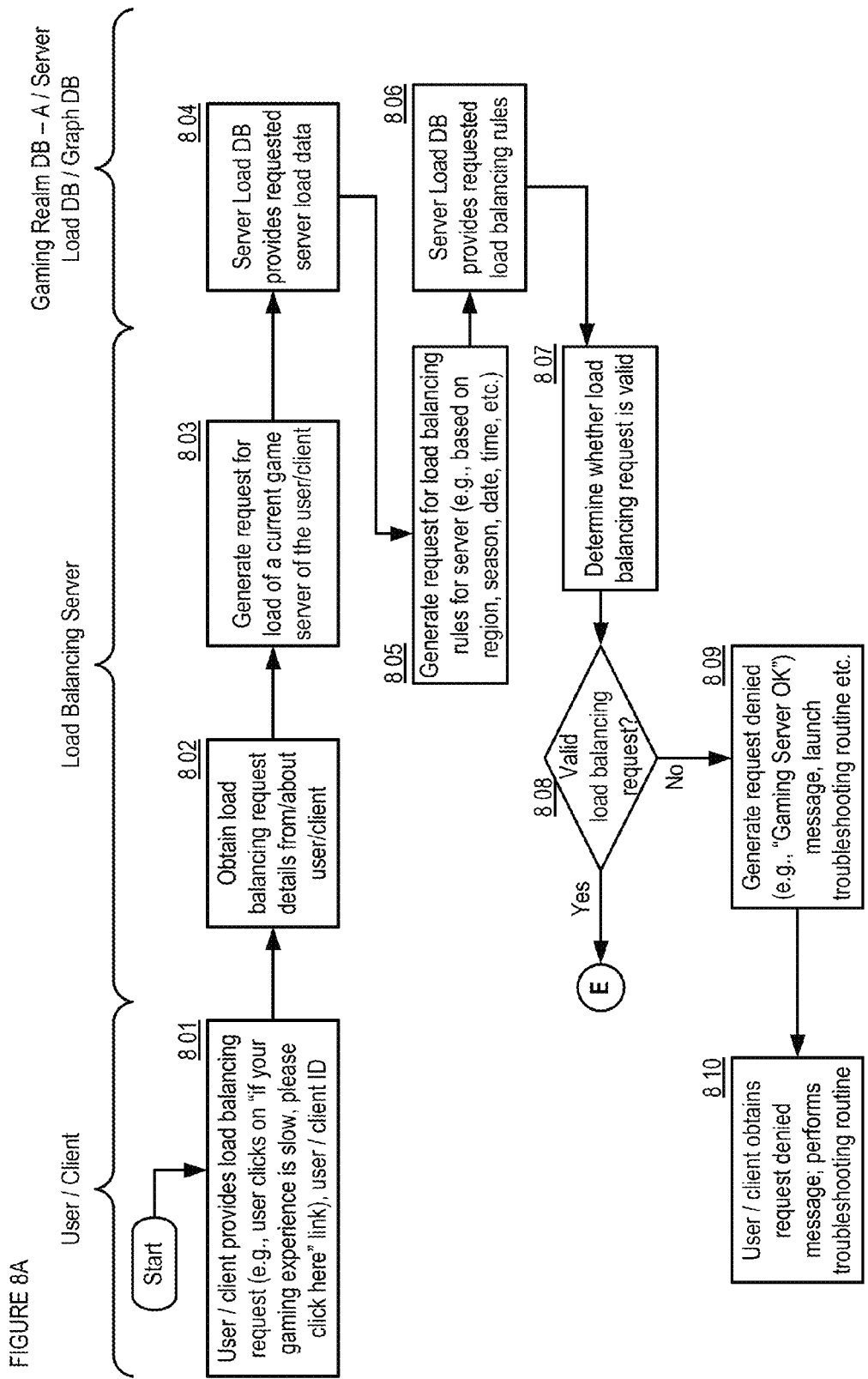

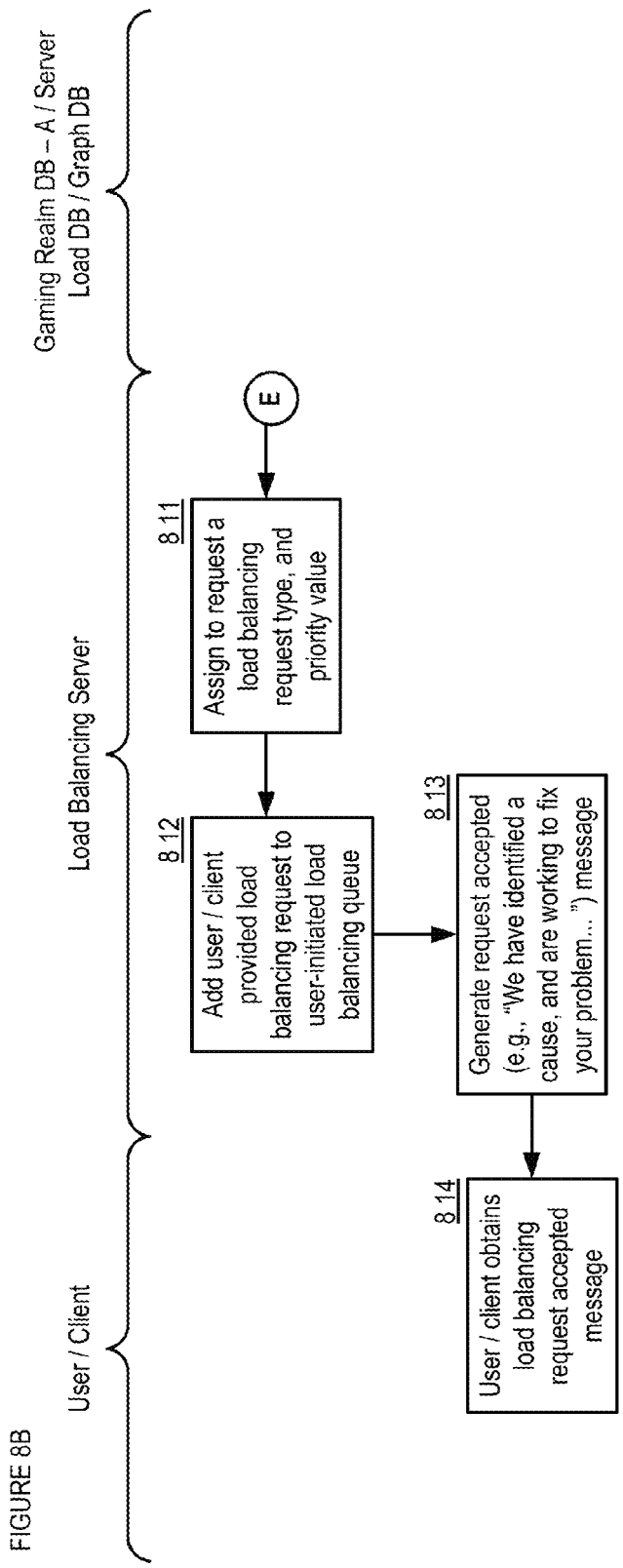

EXAMPLE SERVER-INITIATED LOAD-BALANCING REQUEST (SI-LBR) COMPONENT 900

EXAMPLE LOAD-BALANCING REQUEST AGGREGATOR (LBRA) COMPONENT 1100

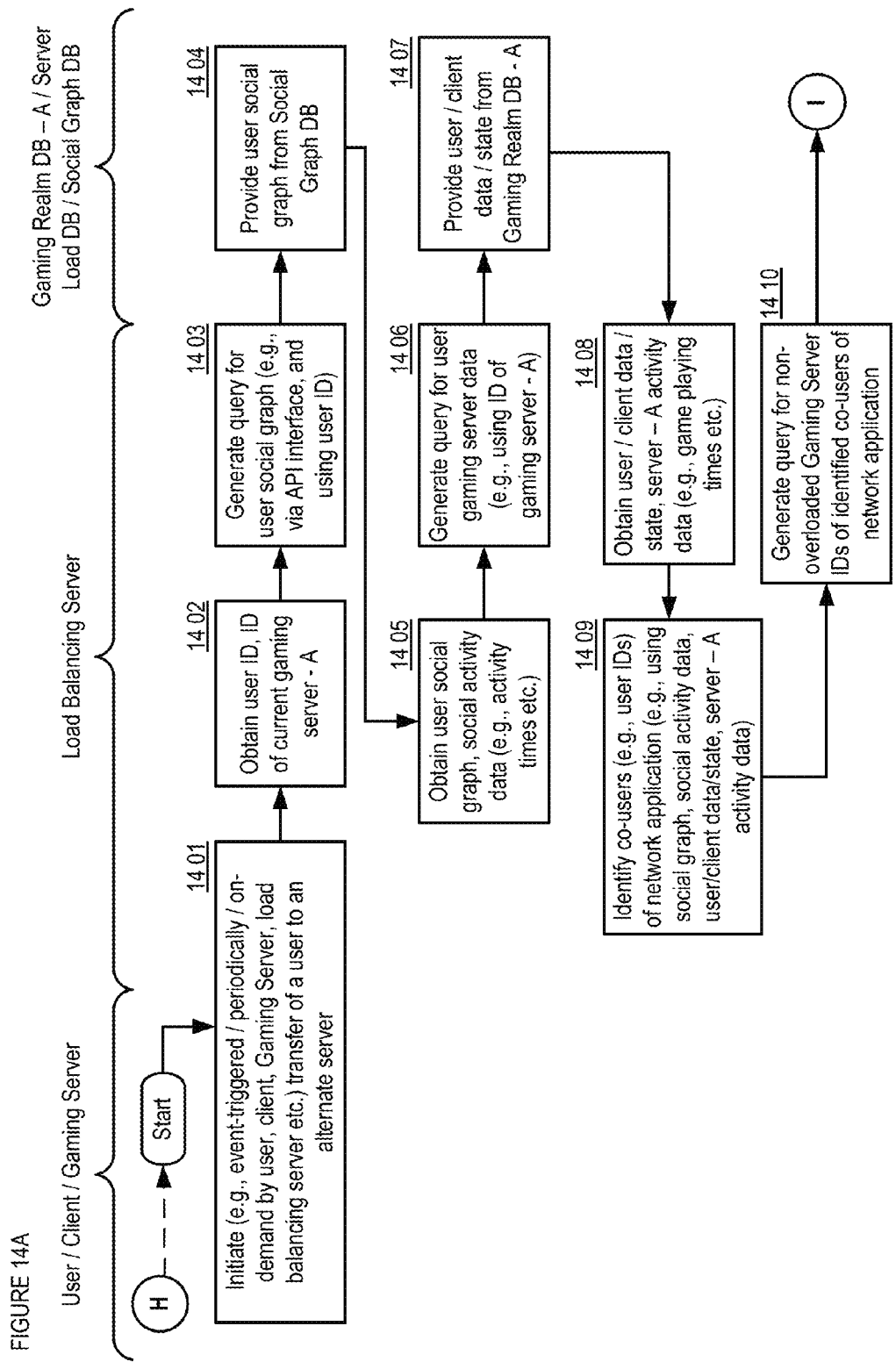
FIGURE 14A  EXAMPLE USER MIGRATION (UM) COMPONENT 1400

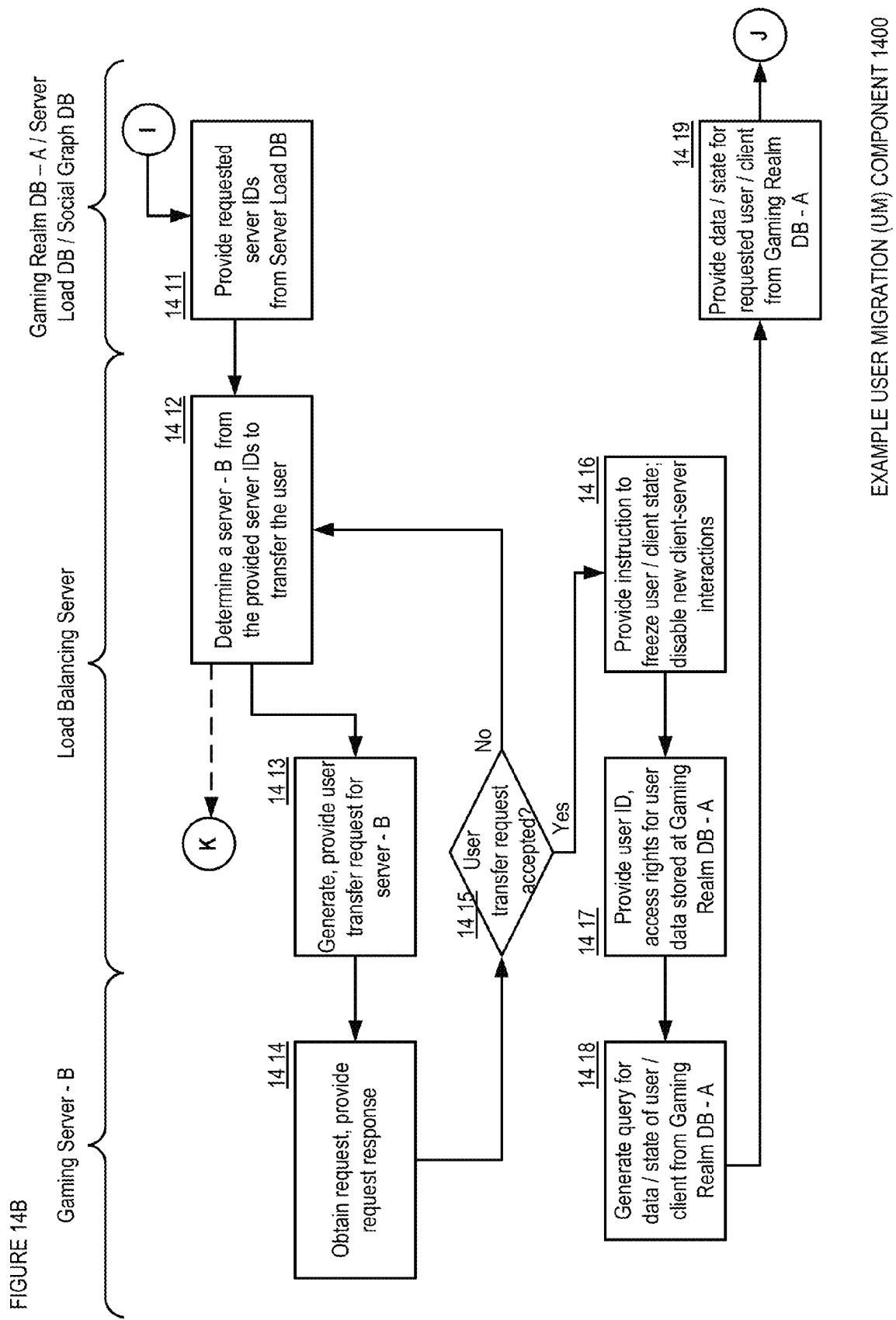

EXAMPLE USER MIGRATION (UM) COMPONENT 1400

APPARATUSES, METHODS AND SYSTEMS FOR AN ONLINE GAME MANAGER

CLAIM OF PRIORITY

This is a continuation of U.S. application Ser. No. 12/894, 280, filed on Sep. 30, 2010, entitled "APPARATUSES, METHODS AND SYSTEMS FOR AN ONLINE GAME MANAGER", which in turn claims priority under 35 USC §119 for U.S. provisional patent application Ser. No. 61/247, 538 filed Sep. 30, 2009, entitled "IMPROVED MAINTENANCE OF ONLINE GAME." The entire contents of the aforementioned applications are herein expressly incorporated by reference.

FIELD

The present invention is directed generally to apparatuses, methods, and systems for multi-user social Internet applications, and more particularly, to APPARATUSES, METHODS AND SYSTEMS FOR AN ONLINE GAME MANAGER.

BACKGROUND

Users may interact online with each other via multi-user applications for Internet-based social networks. Users may suffer a reduced quality of user experience if the server system providing them an application service is overloaded. Server systems may distribute the computational load associated with providing application services to users across a plurality of server computers to attempt improving user experience quality.

SUMMARY

The APPARATUSES, METHODS AND SYSTEMS FOR AN ONLINE GAME MANAGER ("OGM") transform user social graph and online behavioral pattern data inputs via various OGM components into optimized server computational load reports.

In one embodiment, the OGM may process a user server migration request for a user by obtaining user social graph data identifying application co-users, and social activity pattern data associated with the user and the co-users. The OGM may also obtain server load indices of servers associated with the co-users, and server load analysis rules. By analyzing the server load indices using the server load analysis rules, the OGM may identify a subset of the servers as non-overloaded transfer candidate servers. The OGM may calculate transfer candidate server scores for the non-overloaded transfer candidate servers using the user social graph data and the social activity pattern data. Also, the OGM may select one of the non-overloaded transfer candidate servers for migrating the user based on the transfer candidate server scores, and migrate data associated with the user to the selected non-overloaded transfer candidate server.

BRIEF DESCRIPTION OF THE DRAWINGS

The accompanying appendices and/or drawings illustrate various non-limiting, exemplary, inventive aspects in accordance with the present disclosure:

FIGS. 4A-D are of data flow diagrams illustrating exemplary aspects of server load balancing based on a user's social graph and online behavior in some embodiments of the OGM;

FIG. 5 is of a logic flow diagram illustrating exemplary aspects of initiation of a user application session with the OGM in some embodiments of the OGM, e.g., a user session initiation ("USI") component;

FIG. 7 is of a logic flow diagram illustrating exemplary aspects of termination of a user application session with the OGM in some embodiments of the OGM, e.g., a user session termination ("UST") component;

FIGS. 8A-B are of logic flow diagrams illustrating exemplary aspects of processing a user-initiated server load balancing request in some embodiments of the OGM, e.g., a user-initiated load balancing request ("UI-LBR") component;

FIGS. 14A-C are of logic flow diagrams illustrating exemplary aspects of migrating a user from one server to another based on a user's social graph and online behavior in some embodiments of the OGM, e.g., a user migration ("UM") component;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Online Game Manager (OGM)

Figure 1:
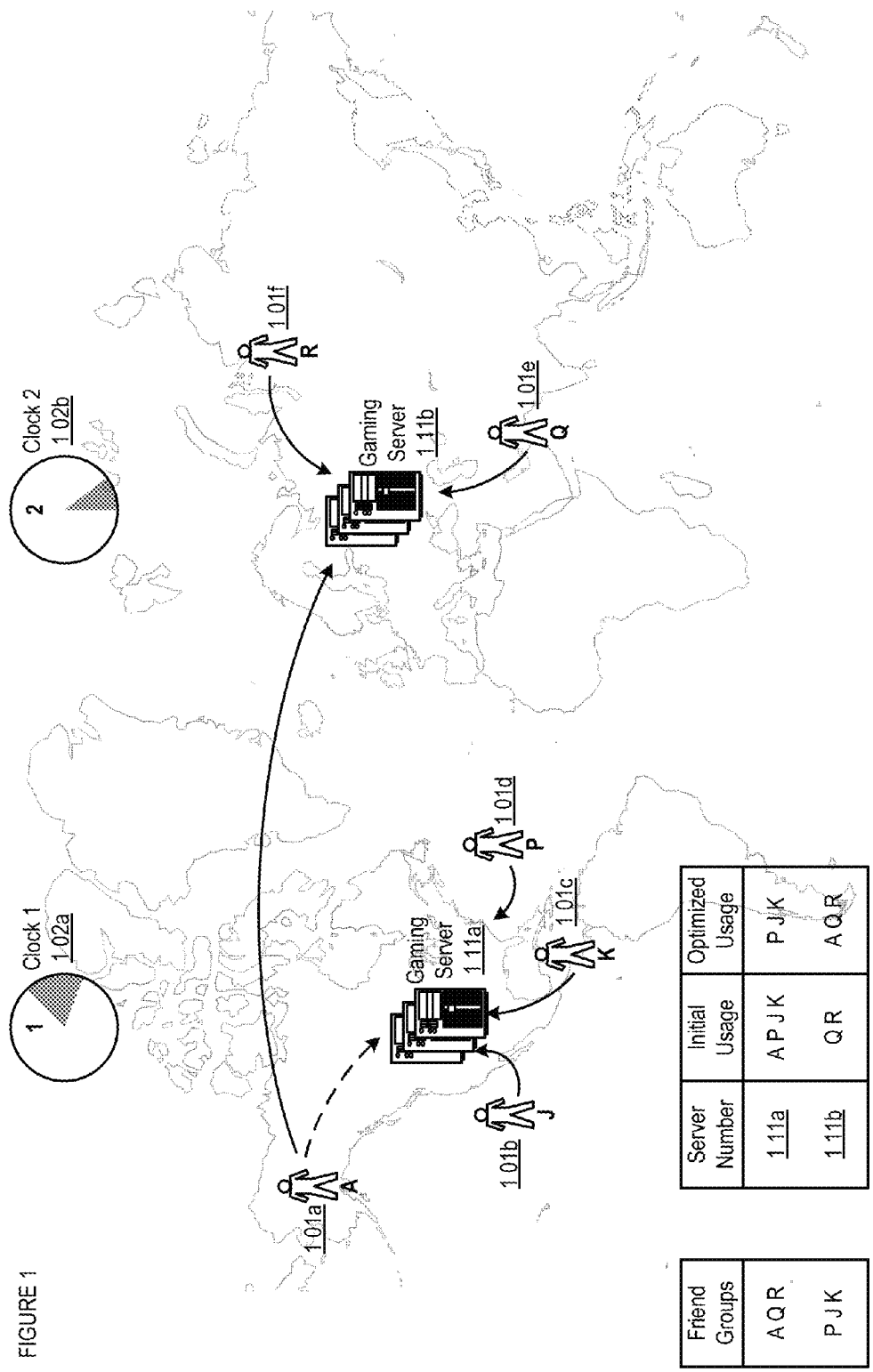
FIG. 1 is of a block diagram illustrating exemplary online game management in some embodiments of the Online Game Manager ("OGM")

FIG. 1 is of a block diagram illustrating exemplary online game management in some embodiments of the Online Game Manager ("OGM"). In some implementations, a user of a multi-user online game, e.g., user A 101*a*, may play online games with his friends, e.g., user Q 101*e* and user R 101*f*. Similarly, a user P 101*d* may have friends user J 101*b* and user K 101*c*, and user P may play online games with users J and K. In some implementations, a plurality of gaming servers may operate to provide the gaming application for (hereinafter "host") the user friend groups {A, Q, R} and {P, J, K}. For example, gaming servers 111*a* and 111*b* may host the user friend groups. In some implementations, user friend groups may play online games with each other at specific times during the day. For example, user friend group {P, J, K} may usually play online games with each other at times indicated by Clock 1 (102*a*). As another example, user friend group {A, Q, R} may usually play online games with each other at times indicated by Clock 2 (102*b*).

In some implementations, users within a single user friend group may be hosted by different gaming servers, while playing the same game with each other. For example, users A, Q and R may be playing the same game with each other. However, gaming server ma may be hosting user A initially, while gaming server 111*b* may be hosting users Q and R initially. In some implementations, a gaming server (e.g., 111*a-b*) may host users from a plurality of user groups. For example, gaming server ma may be hosting user A from group {A, Q, R} and users P, J and K from group {P, J, K}. The gaming server may perform computations necessary to provide gaming services for each of its hosted users, and provide responses to various queries provided by the hosted users. In some implementations, a hosted user may observe gaming server response times for each of the user's queries that are dependent on the number of users hosted by the gaming server when the user presents the queries to the gaming server. The gaming server response times observed by a user hosted by a gaming server may increase as the number of users hosted by the gaming server increases, due to increased burden on the server. In some implementations, a gaming server may host a large enough number of users such that a user hosted by the gaming server experiences an unsatisfactorily long response time from the gaming server.

In some implementations, the OGM may identify an overloaded gaming server. For example, with reference to FIG. 1, the OGM may identify that gaming server ma is overloaded while hosting users A, P, J and K. In such implementations, the OGM may transfer one or more users hosted by the overloaded gaming server to other gaming servers, so as so reduce the load experienced by the currently overloaded gaming server. For example, the OGM may transfer user A away from gaming server 111*a*. In some implementations, the OGM may identify a transfer candidate gaming server to which to transfer the user. For example, the OGM may identify gaming server 111*b* as a transfer candidate gaming server to which to transfer user A, away from gaming server 111*a*. In some implementations, the OGM may identify transfer candidate gaming servers based on the social network and online behavioral activities of the user. For example, the OGM may identify gaming server 111*b* as a transfer candidate gaming server to host user A based on user A's friendship with users Q and R already hosted by gaming server 111*b*, and/or based on the observation that user A's gaming times overlap with those of users Q and R already hosted by gaming server 111*b*.

Figure 2:
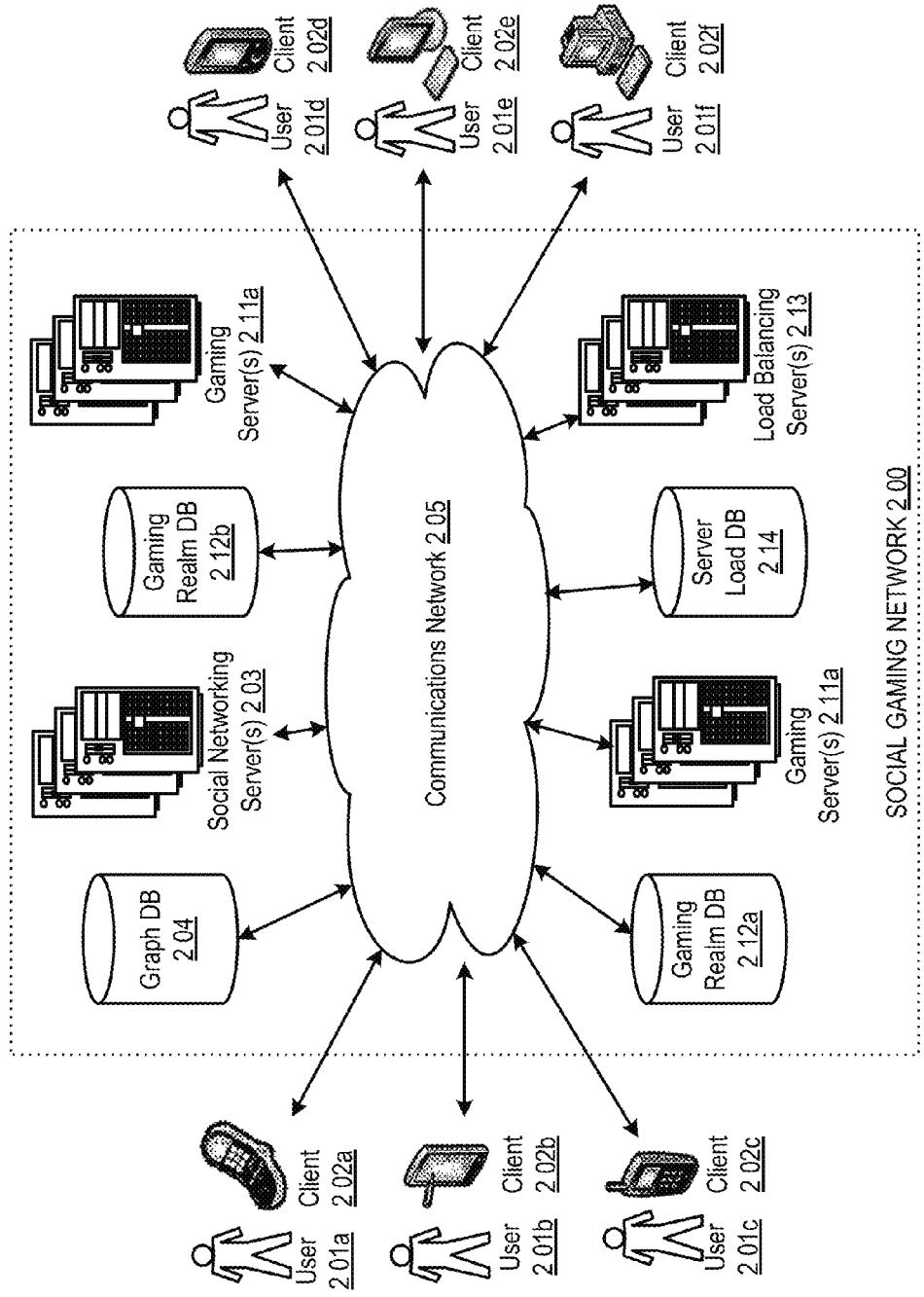
FIG. 2 is of a block diagram illustrating various exemplary OGM components and/or affiliated entities involved in server load balancing based on a user's social graph and online behavior in some embodiments of the OGM.

FIG. 2 is of a block diagram illustrating various exemplary OGM components and/or affiliated entities involved in server load balancing based on a user's social graph and online behavior in some embodiments of the OGM. In some implementations, a plurality of users, e.g., 201*a-f*, may be utilizing a social gaming network, e.g., 200. A user may interact with the social gaming network via one or more client devices ("clients"), e.g., 202*a-f*. For example, the user may provide input into the client device (e.g., mouse click, keyboard entry, touch screen input, multi-touch input, voice commands, human computer interfacing mechanisms, and/or the like). The clients may communicate with each other and/or other entities affiliated with the OGM via a communications network, e.g., 205. For example, the communications network may be a packet-switched computer network. The users may be utilizing a social networking service provided by a social networking server, e.g., 203, to interact with each other. For example, a user may provide an input into his or her client; the client may in response send a message via the communications network to the social networking server; and the social networking server may update a user profile, save the message provided by the user to a database, and/or send message(s) to other user(s). The social gaming network may include a social graph database, e.g., 204, which may store user relationships, social user profiles, user messages, and/or like user social data. The users may engage in online games with each other. For example, the users and/or clients may interact via the communications network with one or more gaming servers, e.g., 211*a-b*. The gaming servers may host one or more gaming applications, and may perform the computations necessary to provide the gaming features to the users and/or clients. One or more gaming realm databases, e.g., 212*a-b*, may store data related to the gaming services, such as the gaming applications/modules, virtual gaming environment ("realm") data, user gaming session data, user scores, user virtual gaming profiles, game stage levels, and/or the like. The gaming servers may utilize the data from the gaming realm databases to perform the computations related to providing gaming services for the users. In some implementations, a server load database, e.g., 214*b*, may store gaming server load statistics such as computational load, server responses times, and/or the like, of the gaming servers. The social gaming network may include a load balancing server, e.g., 213. In some implementations, the load balancing server may communicate with the gaming servers, server load database, social graph database, and/or other OGM-affiliated entities to provide user social relationship and online behavior-sensitive server load balancing.

Figure 3:
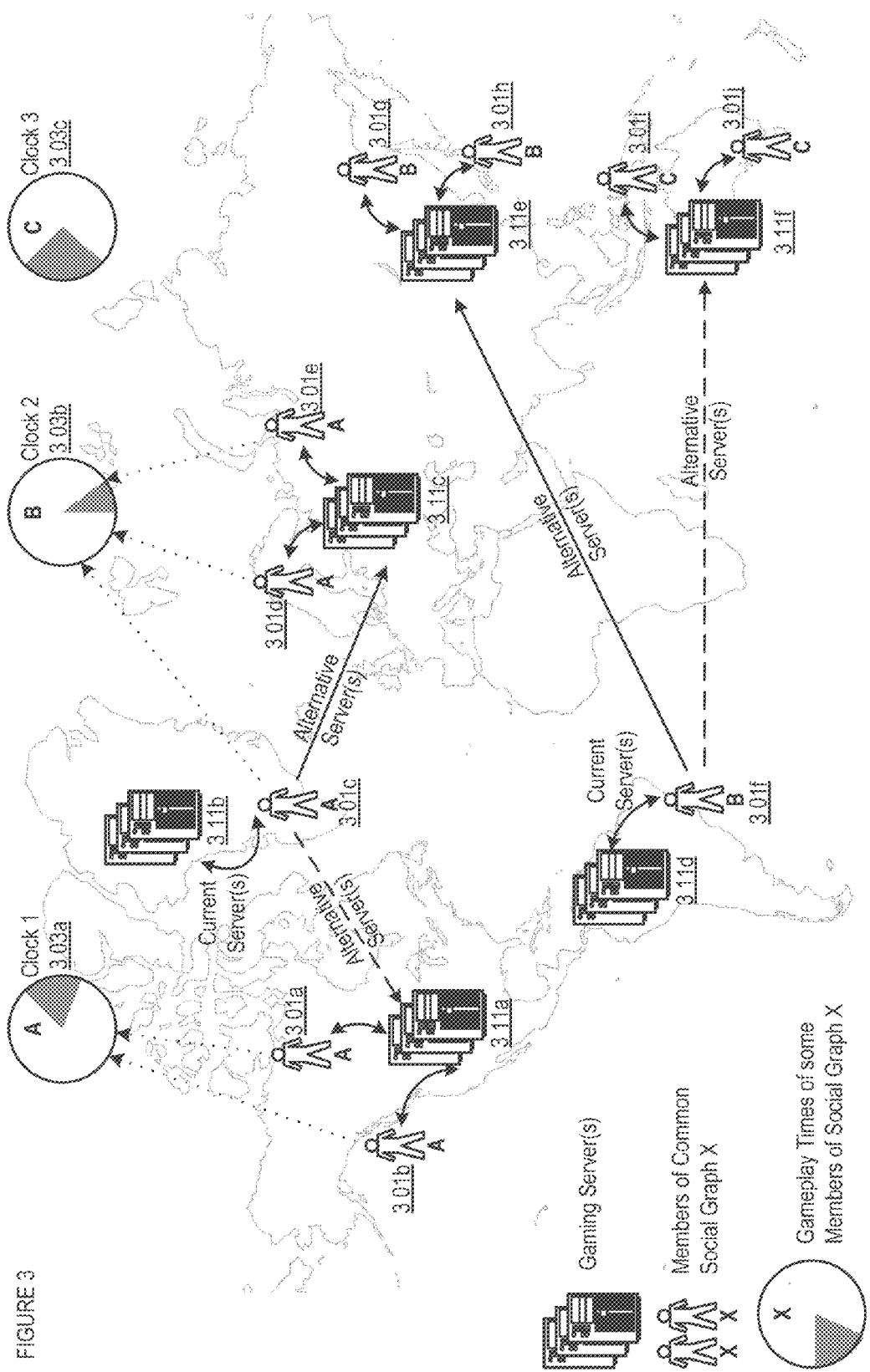
FIG. 3 is of a block diagram illustrating exemplary online game manager criteria utilized in some embodiments of the OGM.
Figure 4B:
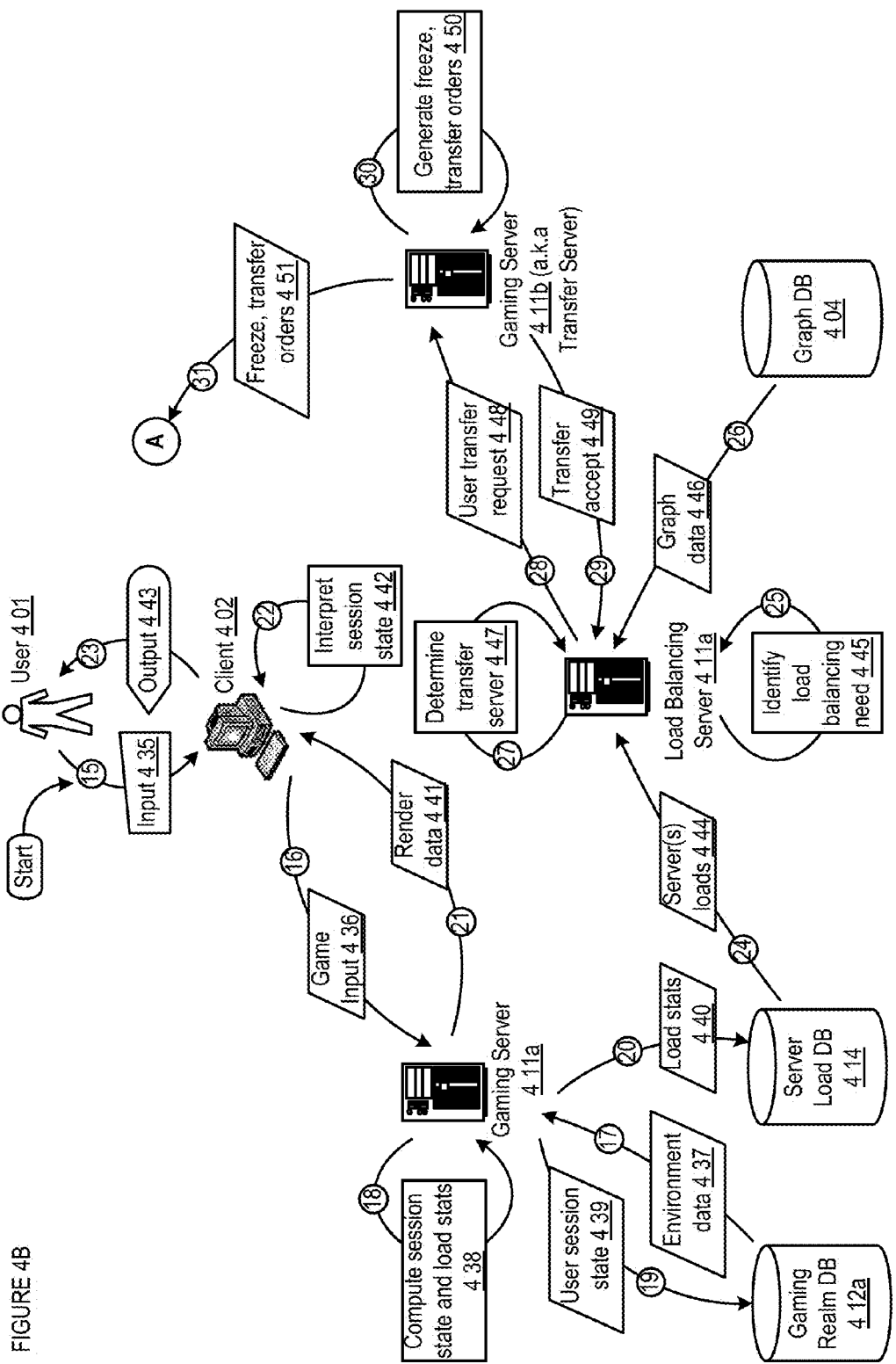
Figure 4C:
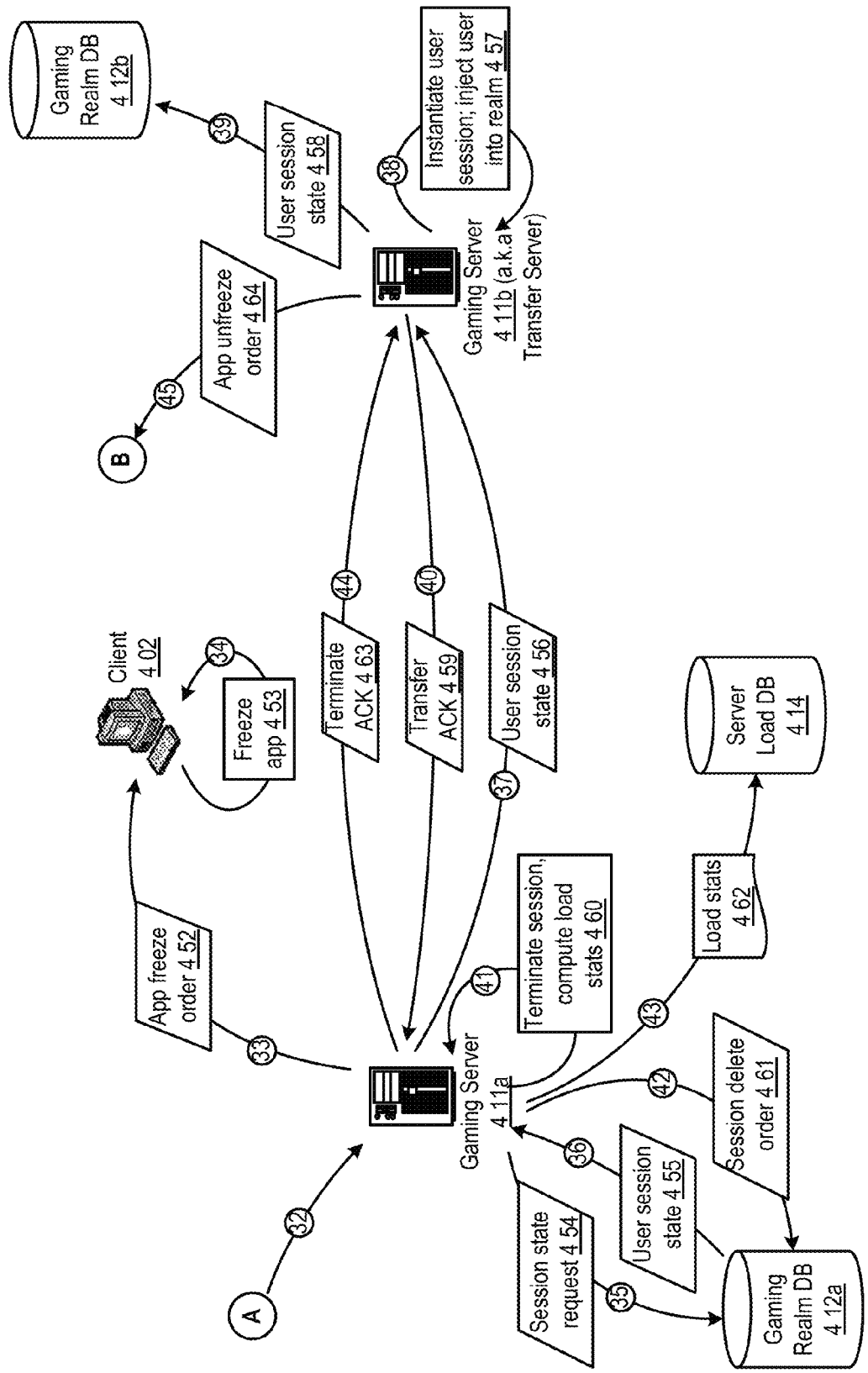
Figure 4D:
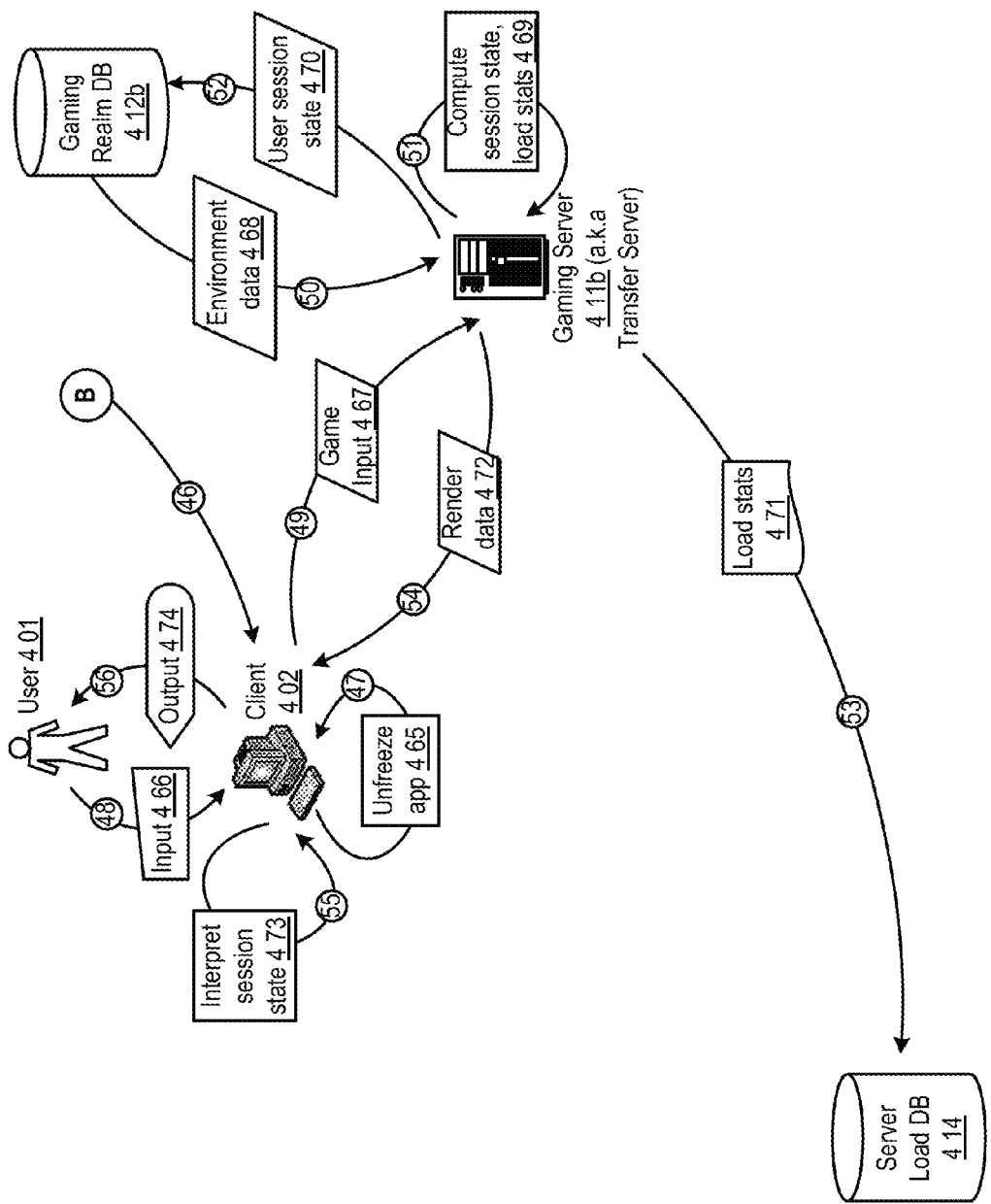

FIG. 3 is of a block diagram illustrating exemplary online game manager criteria utilized in some embodiments of the OGM. In some implementations, users, e.g., 301*a-j*, may establish online social relationships with each other. For example, a user may indicate on an online social networking service that one or more other users are friends. The social networking service may generate a social graph of all users connected to that user by way of relationships formed between the users of the social networking service. For example, with reference to FIG. 3, social graph A may include users 301*a-e* ("A {301*a-e*}"); social graph B may include users 301*f-h* ("B {301*f-h*}"); and social graph C may include users 301*i-j* ("C {301*i-j*}"). U.S. provisional application Ser. No. 61/179,345, entitled "Direct Embedding of Games into Third Party Websites," and United States non-provisional application Ser. No. 12/778,956, entitled "Embedding of Games into Third Party Websites" disclose various aspects and uses of social graphs. The entire contents of these applications are herein expressly incorporated by reference. In some implementations, members of a common social graph may be hosted by different gaming servers. For example, users A{301a-b} of social graph A are hosted by gaming server 311a, while user A{301c} is hosted by gaming server 311b and users A{301d-e} are hosted by gaming server 311c. As another example, B{301f} is hosted by gaming server 311d while B{301g-h} are hosted by gaming server 311e.

In some implementations, the OGM may perform server load balancing based on social graph data of the users of the OGM. For example, the OGM may identify that server 311d is overloaded. In response, the OGM may decide to transfer user B{301f} away from gaming server 311d to reduce the computational load of gaming server 311d. For example, the OGM may identify gaming servers 311e and 311f as transfer candidate gaming servers. The OGM may analyze the extent of the relationship that the current users of the transfer candidate gaming servers have with the transferred user B{301f}. For example, the OGM may determine that co-members of social graph B, users B{301g-h} hosted on gaming server 311e, have a stronger relationship with B{301f} than members of social graph C, users C{301i-j} hosted on gaming server 311f. In some implementations, the OGM may preferentially transfer a user to a gaming server that hosts users who exhibit stronger relationships (e.g., as evidenced by the social graphs connecting the users) to the transferred user. For example, in the configuration described above and illustrated in FIG. 3, the OGM may decide to transfer user B{301f} from gaming server 311d to gaming server 311e rather than gaming server 311f, because user B{301f} is determined to have a closer relation to the users B{301g-h} hosted by gaming server 311e, than users C{301i-j} hosted by gaming server 311f.

In some implementations, the OGM may perform server load balancing based on online gaming and/or social behavior patterns of the users of the OGM. For example, the OGM may identify that server 311b is overloaded. In response, the OGM may decide to transfer user A{301c} away from gaming server 311b to reduce the computational load of gaming server 311b. For example, the OGM may identify gaming servers 311a and 311c as transfer candidate gaming servers. The OGM may utilize the game play times of the users associated with the transfer candidate gaming servers who are also members of the same social graph as A{301c}. For example, the OGM may analyze the game play times of users A{301a-b} of gaming server 311a and the game play times of users A{301d-e} of gaming server 311b, to decide whether to transfer A{301c} to gaming server 311a or 311b. With reference to FIG. 3, the typical game play times of users A{301a-b} are depicted by clock 1 (303a), the typical game play times of users A{301d-e} are depicted by clock 2 (303b), and the typical game play times of users B{301g-h} and C{301i-j} are depicted by clock 3 (303c). Further, although user A{301c} is hosted by gaming server 311b, A{301c}'s typical game play times coincide with those of users A{301d-e} hosted by gaming server 311c—depicted by clock 2 (303b). In some implementations, the OGM may preferentially transfer a user to a gaming server that hosts user social graph co-members who exhibit game play times similar to the transferred user. For example, in the configuration described above and illustrated in FIG. 3, the OGM may decide to transfer user A{301c} from gaming server 311b to gaming server 311c rather than gaming server 311a, because user A{301c}'s game play times are closer to those of users A{301d-e} hosted by gaming server 311c, than users A{301a-b} hosted by gaming server 311a.

FIGS. 4A-D are of data flow diagrams illustrating exemplary aspects of server load balancing based on a user's social graph and online behavior in some embodiments of the OGM. In some implementations, a user 401 may wish to interact with a social gaming network, e.g., 200. The user may utilize a client device, e.g., 402, to interact with the social gaming network. For example, the user may provide input, e.g., 421, into the client device. In various implementations, the user input may include, but not be limited to: keyboard entry, mouse clicks, depressing buttons on a joystick/game console, voice commands, single/multi-touch gestures on a touch-sensitive interface, touching user interface elements on a touch-sensitive display, and/or the like. The client may communicate with the social gaming network, and may provide output, e.g., 434, for the user. For example, the client may provide output including, but not limited to: sounds, music, audio, video, images, tactile feedback, vibration alerts (e.g., on vibration-capable client devices such as a smartphone etc.), and/or the like.

In some implementations, the user may provide input, e.g., 421, to the client device indicating that the user desires to utilize an application (e.g., a game) provided by the social gaming network. In response, the client may generate a gaming app request, and provide the gaming app request, e.g., 422 to a load balancing server, e.g., 411a. For example, a browser application executing on the client may provide, on behalf of the user, a (Secure) Hypertext Transfer Protocol ("HTTP(S)") GET message for a HyperText Markup Language ("HTML") page, wherein the HTML page includes JavaScript™ commands to embed an Adobe® Flash object including an application for the user in the HTML page. An exemplary HTTP(S) GET message that may be provided by a browser executing on the client to request an HTML page is provided below:

```
GET /mafiawars.html HTTP /1.1
From: username@appserver.com
Host: www.appserver.com
User-Agent: Mozilla/4.0
```

In response to the app request, the load balancing server may attempt to identify a gaming server within the social gaming network to which to redirect the gaming app request received from the client. In some implementations, the load balancing server may perform user social relationship and online behavior-sensitive server load balancing. In such implementations, the load balancing server may identify a gaming server to which to redirect the gaming app request based on the loads being experienced (and/or that will be experienced) by the gaming servers and the social-gaming characteristics of the user for whom the load balancing server received gaming app request. The load balancing server may generate a query for server loads of the gaming servers, and provide the server load query to a server load database, e.g., 414. In response to the query, the server load database may provide the requested server load data records, which may include fields such as, but not limited to: a gaming server ID, gaming user ID whose request was serviced, service begin and end timestamps, memory usage for servicing the user request, CPU usage for servicing the user request, response time for servicing the user request, number of page faults for servicing the user request service, number of swaps for servicing the user request service, and/or the like. For example, the load balancing server may execute a Hypertext Preprocessor ("PHP") script including Structured Query Language ("SQL") commands to interface with relational database management system ("RDBMS") database(s). An exemplary listing, written substantially in the form of PHP/SQL commands, illustrating substantive aspects of querying the server load database is provided below:

```
<?PHP
header('Content-Type: text/plain');
$servertype = "gaming";
function server_load_query($servertype, $DBserver, $password) {
mysql_connect("204.192.85.202",$DBserver,$password); // access
database server
mysql_select_db("SERVER_LOAD.SQL"); // select database
table to search
//create query for loads of servers of type ($servertype) 'gaming'
$query = "SELECT
server_id gaming_user_id avg_swaps avg_page_faults
    avg_response_time num_users mem_usage cpu_usage
    FROM ServerLoadTable WHERE
    server_type LIKE '%' $servertype";
$result = mysql_query($query); // perform the search query
mysql_close("SERVER_LOAD.SQL"); // close database access
return $result; // return search result
?>
```

In some implementations, the load balancing server may generate a query for social-gaming graph data of the user, and provide the graph data query, e.g., to a graph database 404a. In response to the query, the graph database may provide the requested graph data, which may include, but not be limited to: user ID, friend ID(s), friend relationship strength(s), flags for whether the co-user are gamer friends and/or social friends, and/or the like. For example, the load balancing server may execute a PHP script including SQL commands to query the graph database. An exemplary listing, written substantially in the form of PHP/SQL commands, illustrating substantive aspects of querying the graph database for graph data is provided below:

```
<?PHP
header('Content-Type: text/plain');
function graph_data_query($user_ID, $DBserver, $password) {
mysql_connect("204.192.85.202",$DBserver,$password); // access
database server
mysql_select_db("GRAPH_DATA.SQL"); // select database
table to search
//create query for social and gaming friend ID(s) of user ($user_ID)
$query = "SELECT friend_ID gaming_flag gaming strength social_flag
    social_strength FROM GraphDataTable WHERE user_id LIKE '%'
    $user_id";
$result = mysql_query($query); // perform the search query
mysql_close("SERVER_LOAD.SQL"); // close database access
return $result; // return search results
?>
```

In some implementations, the load balancing server may query a social networking server (e.g., a Facebook® server) providing a service utilized by the user and his/her friends for social data. For example, the load balancing server may invoke an application programming interface ("API") call to the social networking server. The load balancing server may request that the user login to the social networking service to provide the load balancing server access to the user's social data. For example, the load balancing server may provide an HTML page to the client including authentication commands similar to the exemplary illustrative listing provided below:

```
<html>
    <div id="fb-root"></div>
    <script src="http://connect.facebook.net/en_US/all.js"></script>
    <script>
    FB.init({appId: 'A3BFE5', status: true, cookie: true, xfbml: true});
    FB.Event.subscribe('auth.sessionChange', function(response) {
```

-continued

```
    if (response.session) {
        // A user has logged in, and a new cookie has been saved
    } else {
        // The user has logged out, and the cookie has been cleared
    }
    });
    </script>
</html>
```

The load balancing server may then generate and provide a request for social data including, but not limited to: user ID, friend ID(s), friend relationship strength(s), social activity timestamp(s), message ID(s), message(s), and/or the like. For example, the load balancing server may execute PHP commands similar to those in the exemplary illustrative listing provided below:

```
<?PHP
header('Content-Type: text/plain');
// Obtain user ID(s) of friends of the logged-in user
$friends = json_decode(file_get_contents(
    'https://graph.facebook.com/me/friends?access_token=' .
    $cookie['oauth_access_token']), true);
$friend_ids = array_keys($friends);
// Obtain message feed associated with the profile of the logged-in user
$feed = json_decode(file_get_contents(
    'https://graph.facebook.com/me/feed?access_token=' .
    $cookie['oauth_access_token']), true);
// Obtain messages by the logged-in user's friends
$result = mysql_query('SELECT * FROM content WHERE uid IN (' .
                implode($friend_ids, ',') . ')');
$friend_content = array( );
while ($row = mysql_fetch_assoc($result)) {
    $friend_content[ ] = $row;
}
```

In response, the social networking server may provide the requested information. For example, the social networking server may provide a JavaScript Object Notation format ("JSON")-encoded data structure embodying the requested information. An exemplary JSON-encoded data structure embodying social data (e.g., user ID(s) of friends of the logged-in user) is provided below:

```
{   "data": [
        {   "name": "Tabatha Orloff",
            "id": "483722"},
        {   "name": "Darren Kinnaman",
            "id": "865743"},
        {   "name": "Sharron Jutras",
            "id": "091274"}
    ]}
```

In some implementations, the load balancing server may utilize the server load data, graph data and social data to identify a gaming server, e.g., 425, to which the user's gaming app request may be forwarded for processing, as discussed further below with regard to FIGS. 5 and 14-15. Upon identifying the gaming server to process the user's request, the load balancing server may provide a user session request, e.g., 426, to the identified gaming server. For example, the load balancing server may provide a HTTP(S) POST message requesting acknowledgment from the identified gaming server that it will process the user's gaming app request. For example, the HTTP(S) POST message may include in its message body the user ID, client IP address etc., and a request for user session acknowledgment. An exemplary user session request HTTP(S) POST message is provided below:

```
POST /useradd.php HTTP/1.1
Host: gs1.appserver.com
Content-Type: Application/XML
Content-Length: 229
<?XML version = "1.0" encoding = "UTF-8"?>
<user_session_request>
    <request_id>AJFY54</request_id>
    <timestamp>2010-05-23 21:44:12</timestamp>
    <user_ID>username@appserver.com</user_ID>
    <client_IP>275.37.57.98</client_IP>
</user_session_request>
```

The identified gaming server may receive the load balancing server's user session request, and may provide a user session acknowledgment, e.g., 427, to the load balancing server. For example, the gaming server may provide a HTTP(S) POST message confirming the user ID, client IP address, etc., and providing an acknowledgment message in the body of the HTTP(S) POST message. An exemplary user session acknowledgment HTTP(S) POST message including user session acknowledgment is provided below:

```
POST /useraddack.php HTTP/1.1
Host: www.appserver.com
Content-Type: Application/XML
Content-Length: 267
<?XML version = "1.0" encoding = "UTF-8"?>
<user_session_acknowledgment>
    <request_id>AJFY54</request_id>
    <ack_id>AJFY541</ack_id>
    <timestamp>2010-05-23 21:47:32</timestamp>
    <user_ID>username@appserver.com</user_ID>
    <client_IP>275.37.57.98</client_IP>
</user_session_acknowledgment>
```

In some implementations, upon receiving the gaming server's user session acknowledgment, the load balancing server may provide a URL redirection message to the client. The URL redirection message may include a Uniform Resource Locator ("URL") of the identified gaming server, and may indicate to the client that the client redirect the gaming app request to the identified gaming server. For example, with reference to the exemplary HTTP(S) GET gaming app request message provided by the client, the load balancing server may respond by providing a HTTP(S) REDIRECT 300 message, similar to the exemplary message provided below:

```
HTTP/1.1 300 Multiple Choices
Location: http://gs1.appserver.com/mafiawars.html
<html>
<head>
<title>300 Multiple Choices</title>
</head>
<body>
<h1>Multiple Choices</h1>
</body>
</html>
```

Upon receiving the URL redirection message, the client may provide the gaming app request (e.g., similar to the gaming app request message to the load balancing server) to the identified gaming server. In response the gaming server may generate a gaming app query (e.g., 428) for a gaming app, e.g., 430, and provide the gaming app query (e.g., 429) to a gaming realm database. In response, the gaming realm database may provide the gaming app (e.g., an Adobe® Flash object) to the gaming server. For example, the gaming server may execute a PHP script including SQL commands to query the gaming realm database and obtain the gaming app. An exemplary listing, written substantially in the form of PHP/SQL commands, illustrating substantive aspects of querying the gaming realm database for the gaming app is provided below:

```
<?PHP
header('Content-Type: text/plain');
function app_query($appname, $DBserver, $password) {
mysql_connect("204.192.85.202",$DBserver,$password); // access database server
mysql_select_db("APPS.SQL"); // select database table to search
//create query for requested client-side gaming application
$query = "SELECT client_app FROM AppTable WHERE apptitle LIKE '%' $appname";
$result = mysql_query($query); // perform the search query
mysql_close("APPS.SQL"); // close database access
return $result; // return search results
?>
```

In some implementations, the gaming server may provide the client with a HTML page including a reference to an Adobe® Flash object (including a user application, e.g., 431) stored on the gaming server. An exemplary HTML code listing including JavaScript™ commands referencing an Adobe® Flash object within the HTML page is provided below:

```
<html>
<div id="GameStage">
    If you're seeing this, you don't have Flash Player installed.
</div>
<script type="text/javascript">
    var app = new SWFObject("http://gs1.appserver.com/apps/mafiawars.swf",
    "Media", "640", "480", "8", "#000000");
    app.addParam("quality", "high");
    app.write("GameStage");
</script>
</html>
```

Upon obtaining the app, the client device may execute the app for presentation to the user, e.g., 432. For example, with reference to the examples above, a web browser executing on the client device may render the HTML web page and may communicate with the gaming server to download the Adobe® Flash object. An Adobe® Flash browser plug-in installed on the client device and operating in conjunction with the browser may play/execute the downloaded Flash object for presentation to the user. In some implementations, the app may include interactive features, and may allow the user to provide user input/feedback, e.g. 435, via a variety of mechanisms (e.g., keyboard entry into a command-line interface, mouse input in a graphical user interface, gestures on a touch-sensitive interface, voice commands, etc.). In some implementations, the client device executing the app may generate, maintain, update and/or store data pertaining to the user's interaction with the app (e.g., an app state, an app data structure, a block of memory with data variables, a Flash movie clip, etc.). For example, the app may store a data structure encoded according to the JavaScript Object Notation ("JSON") format. An exemplary JSON-encoded data structure is provided below:

```
"app_data"
{
"app_id": "A236269",
"app_name": "poker",
"player_id": "jqpublic",
```

```
        "player_name": "John Q. Public",
        "game_id": "AHWJ20100630",
        "md5_auth": "f585e3efede0c3b400b25908f8fa3f6d",
        "player_action": {
                "timestamp": "2010-06-30 09:23:47",
                "action_type": "raise",
                "action_amount": "50.00",
                "action_source": "credit card 1"
                }
}
```

In some implementations, the gaming server may generate a secure communications session (e.g., 433, instantiate user session) with the client in order to facilitate communication during the user gaming experience between the client and gaming server. As an example, the app may provide data stored on the client device for the gaming server as user game input, e.g., 436. For example, an Adobe® Flash object running on the client may include ActionScript™ 3.0 commands to create a Secure Sockets Layer ("SSL") connection with a server, generate a message including a JSON-encoded data structure such as illustrated in the example above, and send the message via the secure SSL connection to the server. Exemplary commands, written substantially in the form of ActionScript™ 3.0, to create a secure SSL connection to a server, load data from a locally stored JSON-encoded data file, and send a message including the JSON-encoded data via the SSL connection to the server, are provided below:

```
// import required packages
import flash.events.*;
import flash.net.socket;
import flash.net.URLLoader;
import flash.net.URLRequest;
import com.adobe.serialization.json.*;
// obtain server socket policy file, create socket connection to server port
system.security.loadPolicyFile("xmlsocket://gs1.appserver.com:208");
msg = new socket( );
msg.connect("https://gs1.appserver.com", 255);
// load data as text string from .json file
var loader:URLLoader = new URLLoader( );
var request:URLRequst = new URLRequest( );
request.URL = "data.json";
loader.dataformat = "text"
loader.load(request)
// transmit data to server via secure SSL connection, then close socket
msg.writeMultiByte(loader.data, "UTF-8");
msg.close( );
```

In some implementations, the gaming server may be executing a PHP script implementing a Secure Sockets Layer ("SSL") socket server which listens to incoming communications on a server port to which the client device may send data, e.g., data encoded according to the JavaScript Object Notation ("JSON") format. Upon identifying an incoming communication, the PHP script may read the incoming message from the client device, parse the received JSON-encoded text data to extract information from the JSON-encoded text data into PHP script variables, and store the data (e.g., user session state 434, 439, etc.) and/or extracted information in a relational database accessible using the Structured Query Language ("SQL"). An exemplary listing, written substantially in the form of PHP/SQL commands, to accept JSON-encoded game input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store gaming input data in a gaming realm database
mysql_connect("201.408.185.132",$DBserver,$password); // access
database server
mysql_select("REALM.SQL"); // select database to append
mysql_query("INSERT INTO GamingInputTable (transmission)
VALUES ($data)"); // add data to GamingInoutTable table in a REALM
database
mysql_close("REALM.SQL"); // close connection to database
?>
```

In some implementations, the gaming server may require game rules and/or require environment data related to the user's current gaming environment (e.g., what are the cards being held by the other players in a game of poker?, what are the actions of the members of the user's mafia?, etc.). The gaming server may utilize the environment data 437, e.g., as stored in gaming realm database(s), and the user's gaming input to compute an updated user session state for the client (e.g., representing change of the state of the game, actions of the game player/co-player(s) within the game, etc.). For example, a gaming realm database may store environment data including, but not limited to, user session state(s), such as the exemplary illustrative JSON-encoded user session state data structure provided below:

```
"realm_data"
{
"app_id": "A236269",
"app_name": "poker",
"game_id": "462371",
"player_id": "jqpublic",
"player_name": "John Q. Public",
"md5_auth": "f585e3efede0c3b400b25908f8fa3f6d",
"last_action_timestamp": "2010-06-30 09:23:47",
"player_hand":    {
                card { "suit": "clubs",
                       "value": "8"},
                card { "suit": "hearts",
                       "value": "Q"},
                card { "suit": "hearts",
                       "value": "K"},
                card { "suit": "spades",
                       "value": "9"},
                card { "suit": "diamonds",
                       "value": "7"}
                }
}
```

In some implementations, the gaming server may utilize a game ID of the game in progress to query its gaming realm database to identify the user IDs of the users involved in the game, and identify IP addresses of the gaming realm database(s) storing the user session states of the identified users. The gaming server may then query the identified gaming realm database(s) for the user sessions states of the users. For example, the gaming server may utilize PHP/SQL commands similar to the exemplary illustrative commands provided below:

```
<?PHP
header('Content-Type: text/plain');
// query for game players and associated realm database IP addresses
mysql_connect("204.192.85.202",$DBserver,$password); // access database server
mysql_select_db("REALM.SQL"); // select database table to search
$query = "SELECT players_ID realm_IP FROM RealmTable WHERE
    game_ID LIKE '%' $gameid";
$result = mysql_query($query); // perform the search query
mysql_close("REALM.SQL"); // close database access
// query for game player session states sequentially
$rows = mysql_num_rows($result);
for ($k = 0; $k <= $rows-1; $k++) {
    // obtain player ID, realm database IP address
    $uid = mysql_result($result,k,0);
    $ip = mysql_result($result,k,1);
    // connect to player's realm database, download player's session state
    mysql_connect($ip,$DBserver,$password); // access database server
    mysql_select_db("REALM.SQL"); // select database table to search
    $query = "SELECT user_state FROM RealmTable WHERE
        user_ID LIKE '%' $uid";
    // save player's session state to array
    $state[ ] = mysql_query($query); // perform the search query
    mysql_close("REALM.SQL"); // close database access
} // end for-loop
?>
```

Upon obtaining the user sessions states for the players in the game, the gaming server may compute a new session state(s) for the user(s), e.g., 438. The gaming server may save the new session state(s) for the user(s) to the gaming realm database, e.g., 439. For example, the gaming server may utilize PHP/SQL commands similar to those illustrated in the example above with regard to storing gaming input data in the gaming realm database. In some implementations, the gaming server may also determine the computational load experienced by the gaming server in order to perform the computation of the new sessions state(s) for the user(s). For example, the gaming server may generate load statistics (e.g., 440) including, but not limited to: service begin and end timestamps, computation time, response time for servicing the user request, memory usage for servicing the user request, CPU usage for servicing the user request, number of page faults for servicing the user request service, number of swaps for servicing the user request service, and/or the like. An exemplary listing illustrating substantive aspects of providing load statistics to a server load database, written substantially in the form of PHP/SQL commands, is provided below:

```
<?PHP
header('Content-Type: text/plain');
mysql_connect("204.192.85.202",$DBserver,$password); // access database server
mysql_select_db("SERVER_LOAD.SQL"); // connect to string queue database
mysql_query("INSERT INTO ServerLoadTable
(server_id gaming_user_id avg_swaps
    avg_page_faults avg_response_time mem_usage
    cpu_usage start_time end_time timestamp")
    VALUES ($serverid, $userid, $swaps, $page_faults, $resp_time,
    $mem_use,
    $cpu_use, $start, $end, time( )); // add load statistics record
mysql_close("SERVER_LOAD.SQL"); // close connection to database
?>
```

In some implementations, the gaming server may provide results of the computation for the client. For example, the gaming server may generate a data structure representative of a scalable vector illustration, e.g., a Scalable Vector Graphics ("SVG") data file such as render data 441. The data structure may include, for example, data representing a vector illustration. An exemplary vector illustration data structure (an XML-encoded SVG data file, written substantially according to the World-Wide Web Consortium's SVG standard), and including data for an example vector illustration comprising a circle, an open path, a closed polyline composed of a plurality of line segments, and a polygon, is provided below:

```
<?XML version = "1.0" standalone = "no">
<!DOCTYPE svg PUBLIC "-//W3C//DTD SVG 1.1//EN"
    "http://www.w3.org/Graphics/SVG/1.1/DTD/svg11.dtd">
<svg width = "100%" height = "100%" version = "1.1"
    xmlns="http://www.w3.org/2000/svg">
    <circle cx="250" cy="75" r="33" stroke="blue"
    stroke-width="2" fill="yellow"/>
    <path d="M250 150 L150 350 L350 350 Z" />
    <polyline points="0,0 0,20 20,20 20,40 40,40 40,80"
    style="fill:white;stroke:green;stroke-width:2"/>
    <polygon points="280,75 300,210 170,275"
    style="fill:#cc5500;
    stroke:#ee00ee;stroke-width:1"/>
</svg>
```

The gaming server may provide the render data via one or more HTTP(S) POST messages and/or using an SSL connection with the client, e.g., as illustrated in examples provided above in this disclosure. Upon obtaining the render data, the client may render, e.g., 442 the visualization represented in the data structure for display to the user, e.g., 443. For example, the client may be executing an Adobe® Flash object within a browser environment including ActionScript™ 3.0 commands to render the visualization represented in the data structure, and display the rendered visualization for the user. Exemplary commands, written substantially in a form adapted to ActionScript™ 3.0, for rendering a visualization of a scene within an Adobe® Flash object with appropriate dimensions and specified image quality are provided below:

```
// import necessary modules/functions
import flash.display.BitmapData;
import flash.geom.*;
import com.adobe.images.JPGEncoder;
// generate empty thumbnail bitmap with appropriate dimensions
var bitSource:BitmapData = new BitmapData (sketch_mc.width,
sketch_mc.height);
// capture snapsot of movie clip in bitmap
bitSource.draw(sketch_mc);
var imgSource:Image = new Image( );
imgSource.load(new Bitmap(bitSource, "auto", true));
// generate scaling constants
var res:Number = 640 / max(sketch_mc.width, sketch_mc.height);
var width:Number = round(sketch_mc.width * res);
var height:Number = round(sketch_mc.height * res);
// scale the image
imgSource.content.width = width;
// JPEG-encode bitmap with 85% JPEG compression image quality
var jpgEncoder:JPGEncoder = new JPGEncoder(85);
var jpgStream:ByteArray = jpgEncoder.encode(jpgSource);
// Pass JPEG-encoded bitmap to PHP script for further use
var header:URLRequestHeader = new URLRequestHeader
    ("Content-type", "application/octet-stream");
var jpgURLRequest:URLRequest = new
    URLRequest("jpg_encoder_download.php?name=sketch.jpg");
jpgURLRequest.requestHeaders.push(header);
jpgURLRequest.method = URLRequestMethod.POST;
jpgURLRequest.data = jpgStream;
navigateToURL(jpgURLRequest, "_blank");
```

In some implementations, the load balancing server, e.g., 411*a* may be triggered to perform user social relationship and online behavior-sensitive server load balancing. For example, a user, client, gaming server and/or other entity affiliated with the OGM may provide a request for user social relationship and online behavior-sensitive server load balancing. In some implementations, the load balancing server may perform a periodic and/or continuous monitoring of the server loads from the server load database, and may identify the need for load balancing based on analyzing the server loads, e.g., 445. Upon identifying a need for server load balancing, the load balancing server may obtain the server loads (e.g., 444, from the server load database) and graph data (e.g., 446, from the graph database and/or social networking server). For example, the load balancing server may issue PHP and/or SQL commands similar to the illustrative examples provided previously in this disclosure to query the server load database, graph database and/or social networking server for the server loads, graph data, and social data respectively. Using the server loads, graph data and/or social data, the load balancing server may identify one or more servers to which the OGM may transfer the user (hereinafter "transfer candidate servers"). The load balancing server may select, e.g., 447, one of the transfer candidate servers as a transfer server to which to transfer the user's session. Upon selecting the transfer server, the load balancing server may send a user transfer request, e.g., 448, to the transfer server. For example, the load balancing server may send a HTTP(S) POST message requesting acknowledgment from the transfer server that it will accept the transfer of the user's session. For example, the HTTP(S) POST message may include in its message body the user ID, current gaming server ID, client IP address etc., and a request for user transfer acknowledgment. An exemplary user transfer request HTTP(S) POST message is provided below:

```
POST /useradd.php HTTP/1.1
Host: gs1.appserver.com
Content-Type: Application/XML
Content-Length: 229
<?XML version = "1.0" encoding = "UTF-8"?>
<user_transfer_request>
    <request_id>AJFY64</request_id>
    <timestamp>2010-05-24 21:44:12</timestamp>
    <user_ID>username@appserver.com</user_ID>
    <client_IP>275.37.57.98</client_IP>
    <server_ID>gs1.appserver.com</server_ID>
</user_transfer_request>
```

The transfer server may receive the load balancing server's user session request, and may provide a user transfer accept acknowledgment, e.g., 449 to the load balancing server. For example, the transfer server may provide a HTTP(S) POST message confirming the user ID, client IP address, etc., and providing an acknowledgment message in the body of the HTTP(S) POST message. An exemplary user session acknowledgment HTTP(S) POST message including user session acknowledgment is provided below:

```
POST /useraddack.php HTTP/1.1
Host: www.appserver.com
Content-Type: Application/XML
Content-Length: 267
<?XML version = "1.0" encoding = "UTF-8"?>
<user_transfer_acknowledgment>
    <request_id>AJFY64</request_id>
    <ack_id> AJFY641</ack_id>
    <timestamp>2010-05-24 21:46:12</timestamp>
    <user_ID>username@appserver.com</user_ID>
    <client_IP>275.37.57.98</client_IP>
    <server_ID>gs2.appserver.com</server_ID>
</user_transfer_acknowledgment>
```

In some implementations, upon accepting transfer of the user from the gaming server 411a, the transfer server (e.g., gaming server 411b) may generate freeze and/or transfer orders, e.g., 450, and send, e.g., 451, the freeze and/or transfer orders to inform the client to temporarily suspend initiation of communication with the server(s) (e.g., only accept incoming communication from servers) while the user transfer takes place between the gaming server and the transfer server, and/or to communicate with the transfer server, rather than the gaming server, upon resumption of communication. The transfer server may, for example, generate a socket connection with an Adobe® Flash object running on the client (as illustrated in examples above), and write the freeze and/or transfer orders via the socket connection to the Adobe Flash® object using PHP commands similar to the example below:

```
<?PHP
header('Content-Type: text/plain');
$message = "<?XML version = "1.0" encoding = "UTF-8"?><order><1>freeze</1><2>transfer<ip> gs2.appserver.com</ip></2></order>"
$len = strlen($message);
$offset = 0;
while ($offset < $len) {
    $sent = socket_write($socket, substr($message, $offset),
    $len-$offset);
    if ($sent === false) {
        break; // Error occurred, break the while loop}
    $offset += $sent;}
?>
```

Upon receiving the freeze order (e.g., 451-452), the client 402 may freeze, e.g., 453, the client application (e.g., prevent the Adobe Flash® object from sending requests to server(s)). The OGM may then initiate the user transfer from gaming server to the transfer server. The gaming server, e.g., 411a, may provide a request for the user's session state 454 from the gaming realm database associated with the gaming server (e.g., 412a), for example, using PHP/SQL commands similar to examples provided above. In response, the gaming realm database 412a may provide the request user session state, e.g., 455. The gaming server may then transfer the user session state, e.g., 456, to the transfer server (e.g., gaming server 411b). For example, the gaming and transfer servers may establish a secure SSL connection with each other, and the gaming server may send the user session state data to the transfer server using PHP commands similar to the examples above. Upon obtaining the user session state data from the gaming server, the transfer server may instantiate 457 a user session for the user, and store, e.g., 458, the user session state data obtained from the gaming server in its gaming realm database (e.g., 412b). Upon completion of user session data transfer and storage, the transfer server may provide a transfer acknowledge message, e.g. 459, for example, using PHP commands as such as in the examples above, to transfer an XML data structure via a SSL connection between the transfer and gaming servers. Upon receiving the transfer acknowledgment from the transfer server, the gaming server may terminate, e.g., 460, its user session corresponding to the user (e.g., 401) and compute new load statistics after deletion of the user session. The gaming server may also delete, e.g., 461, the user session data from its gaming realm database (for example, by executing a PHP script issuing SQL commands to the database). Upon deletion of user-related data from the gaming server and/or its gaming realm database, the gaming server may provide a session termination acknowledgment, e.g., 463, to the transfer server.

In some implementations, the transfer server may provide an app unfreeze order, e.g., 464, for the client (e.g., allowing the Adobe® Flash object to resume communications with the server) upon receiving the session termination acknowledgment. For example, the transfer server may provide an app unfreeze order as a HTTP(S) POST message similar to the examples provided above. In response, the client may unfreeze the app, e.g., 465, and resume communication with the server components, e.g., with the transfer server. For example, the client may allow the user to provide user input/feedback, e.g., 466, and update and/or store data pertaining to the user's interaction with the app. The app may provide data stored on the client device for the transfer server as user game input, e.g., 467. Upon obtaining the game input, the transfer server may obtain the user sessions states for the players in the game, and may compute a new session state(s) for the user(s). For example, the transfer server may utilize the environment data, 468, e.g., as transferred from the gaming server's gaming realm database and stored in the transfer server's gaming realm database(s), and/or the user's gaming input to compute an updated user session state, e.g., 469, for the client. The transfer server may also determine the computational load experienced by the transfer server in order to perform the computation of the new sessions state(s) for the transferred user(s). The transfer server may store the computed new user session state, e.g., 470, in its gaming realm database, e.g., 412b, and store the load statistics, e.g., 471, in the server load database. Via the computation, the transfer server may have generated a data structure representative of a visualization (e.g., a scalable vector illustration such as a Scalable Vector Graphics ("SVG") data file), e.g., render data 472, and may provide the render data for the client. Upon obtaining the render data, the client may render, e.g., 473, the visualization represented in the data structure for display to the user, e.g., 474.

FIG. 5 is of a logic flow diagram illustrating exemplary aspects of initiation of a user application session with the OGM in some embodiments of the OGM, e.g., a user session initiation ("USI") component 500. In some implementations, a user and/or client may generate a request, e.g., 501, to join a multi-user network application (e.g., a massively multi-player online game). The client may provide the generated request 502 for an app for a server (e.g., load balancing server, gaming server—A, etc.). For example, a web browser executing on the client may provide a HTTP(S) GET message requesting a HTML page including JavaScript™ commands to embed an Adobe® Flash object including the application for the user in the HTML page, as illustrated in the example provided with reference to FIGS. 4A-D. The server receiving 503 the app request may determine that user credentials are required in order to determine whether the user is authenticated to use the app. The server may provide a mechanism for the user to provide the requested credentials. For example, in some implementations, the server may provide an HTML page with an input form for the user to provide user credentials, and request user credentials. The user may input the user credentials into the HTML input form, and press a submit button included in the HTML form. Upon pressing the submit button, the web browser of the client device may generate a HTTP(S) POST message including the user-provided form inputs for the server. As another example, in some implementations, the server may provide an Adobe® Flash object including ActionScript™ 3.0 commands to request the user to provide user credentials by entering the credentials into input text fields included in the Adobe® Flash object, and may provide the user-entered credentials for a server via a HTTP(S) POST message to the server.

Upon obtaining the user credentials, the server may query a user profile database to determine whether the user is authenticated to use the app. For example, the server may implement a PHP script including commands to query a user profile database for user authentication details, and may compare the authentication details obtained via querying the database with the user-entered credentials. If the user is authenticated (e.g., 504, option "Yes"), the load balancing and/or gaming servers may execute a gaming server selection procedure, e.g., 506-507, to determine which gaming server should host the user/client (e.g., using the User Migration component 1400 as described in FIGS. 14A-C, and the Server Transfer Selection component 1500 as described in FIG. 15). Upon identifying the gaming server to host the user, the load balancing server and/or identified gaming server may query, e.g., 508, a gaming realm database for an app to provide for the user, based on the details of the user's app request. The server may provide, e.g., 509, the retrieved app for the user to the client device, using e.g., an IP address for the client device included in the app request message originally provided by the user. The client, upon obtaining the app may execute, if required (e.g., 510, Option "Yes"), any installation procedures, e.g., 511, required to install the app on the client device, and then execute/display the app for the user. For example, the client may obtain a Shockwave Flash (*.swf) object from the server, and may invoke an Adobe® Flash web browser plug-in to process and display the *.swf object for the user.

In some implementations, the client device and gaming server may generate a session, e.g., 512, for the user/client to facilitate (secure) communications between the client and the server. For example, an Adobe® Flash object running within a browser environment on the client may include Action-Script™ 3.0 commands to create a Secure Sockets Layer ("SSL") connection with a server, and the server may be implementing a PHP script implementing a SSL socket server which listens to incoming communications on a server port to which the client device sends data, as described previously. Upon generating the session with the client, the gaming server may provide, e.g., 513, (e.g., using PHP/SQL commands described in the examples above) the details of the session in a server load database, including, but not limited to: gaming server ID, user ID, user name, app name, app ID, socket ID, socket expiry time, socket bandwidth, communication protocols, security protocols, communication priority level, and/or the like. Upon receiving the session details, the server load database may store the session details for later use.

Figure 6A:
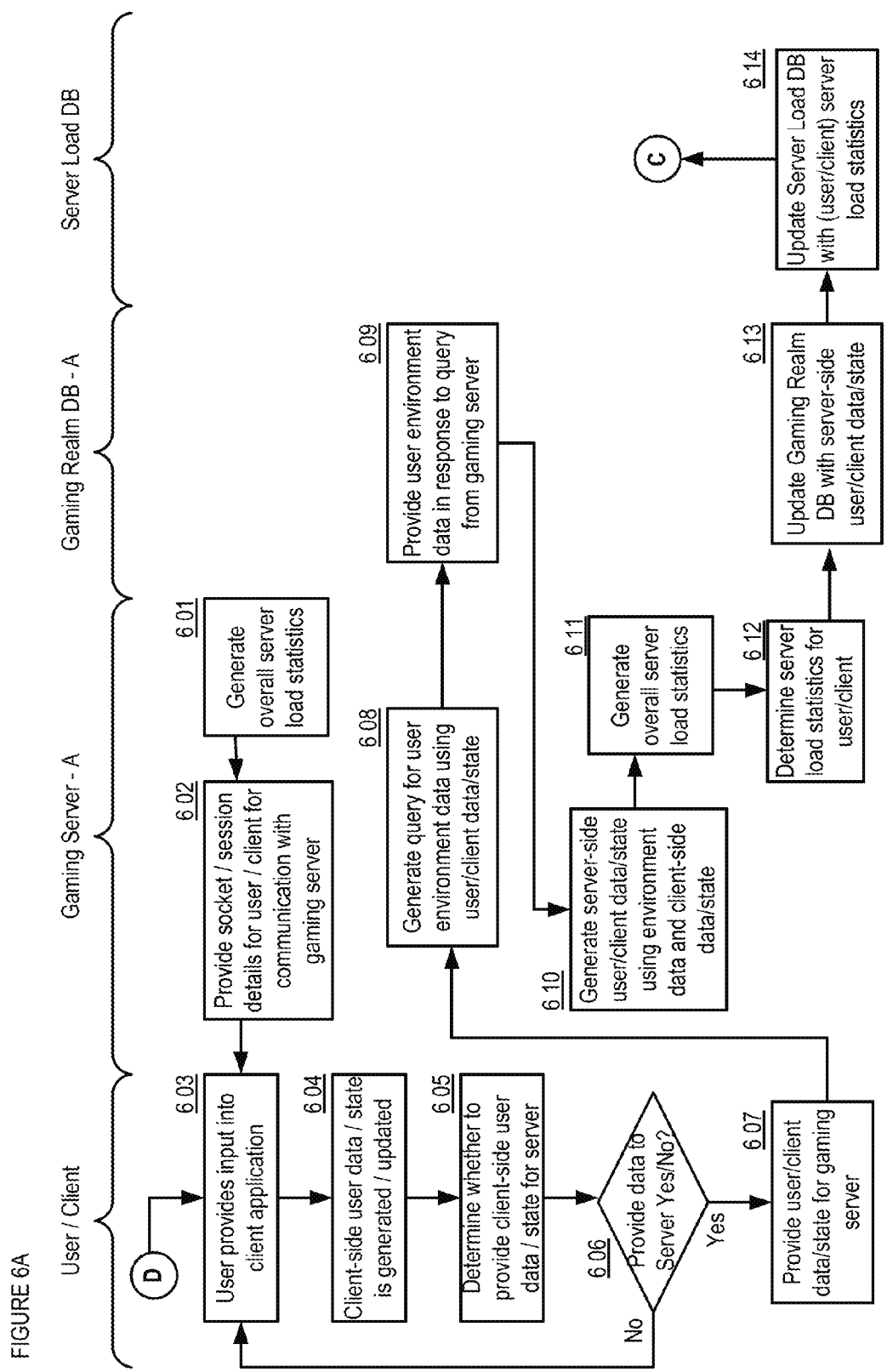
FIGS. 6A-B are of logic flow diagrams illustrating exemplary aspects of implementing user gaming interactions with the OGM within a user application session in some embodiments of the OGM, e.g., a user gaming interaction ("UGI") component.
Figure 6B:
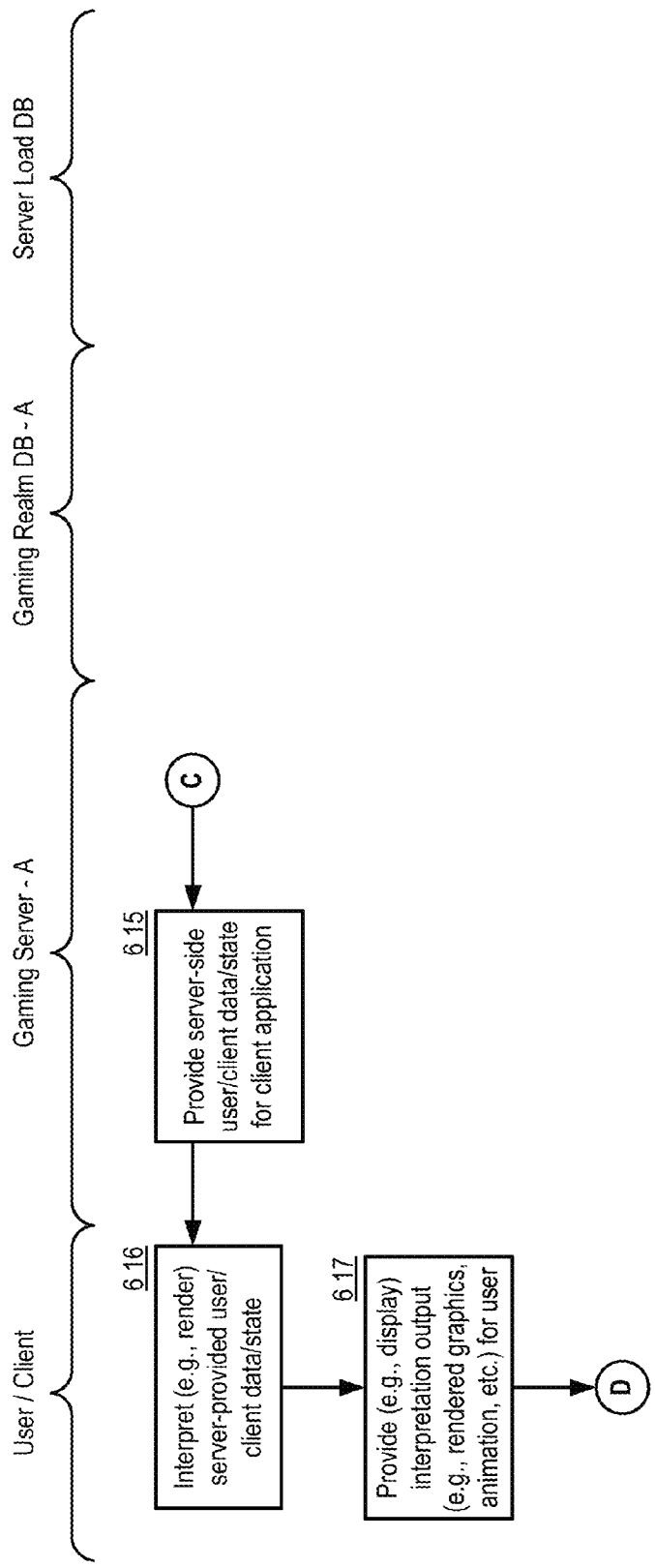

FIGS. 6A-B are of logic flow diagrams illustrating exemplary aspects of implementing user gaming interactions with the OGM within a user application session in some embodiments of the OGM, e.g., a user gaming interaction ("UGI") component 600. In some implementations, the gaming server may obtain a snapshot of its computational and/or other load before providing services for a user/client. For example, the server may obtain metrics including, but not limited to: number of users currently hosted, total memory usage, total CPU usage, average response time for servicing user requests, number of page faults per user request, number of swaps per user request, and/or the like. For example, the server may include PHP commands similar to the exemplary listing below to obtain load metrics with regard to servicing a particular user request and/or obtaining global load information with regard to servicing all of its hosted users:

```
<?PHP
//measure time elapsed for a database query//
$start = microtime(true);
$result = mysql_query($query);
$end = microtime(true);
```

-continued

```
$time = $end − $start;
// measure usage statistics for a php script
$dat = getrusage( );
echo $dat["ru_nswap"];          // number of swaps
echo $dat["ru_majflt"];         // number of page faults
echo $dat["ru_utime.tv_sec"]; // user time used (seconds)
echo $dat["ru_utime.tv_usec"];           // user time used (microseconds)
echo $dat["ru_utime.tv_sec"]*1e6+$dat["ru_utime.tv_usec"];
    // actual time (in microseconds)
?>
```

The server may use such commands to determine its overall capacity to accept new users, as well determine the amount of resources available that are available to a particular user being serviced. The server may obtain a snapshot before it commences servicing a user request from a user/client, and for example, may provide the session details (e.g., port number on the server to which the client must send user requests) after obtaining the load snapshot.

In some implementations, the app executing on the client may include interactive features for the user. For example, the app may be configured to accept user input/feedback via a variety of mechanisms including, but not limited to, keyboard entry, mouse input, touch input, touch gestures, voice commands, auto-form filling, and/or the like. The app may provide a variety of user interfaces configured to accept such input from the user including, but not limited to, command line keyboard entry interfaces, graphical user interfaces, touch-sensitive interfaces, and/or the like. In some implementations, the user may interact, e.g., 603, with the app and provide input into the app. For example, the user may provide input as part of a gaming application, a social application (e.g., chat room, instant messaging, etc.), information resource selection, and/or the like. The client device may detect input from the user. For example, the client may include hardware resources (e.g., keyboard, mouse, etc.) that provide triggers when a user manipulates the input hardware resources. Upon detecting user input, the client may obtain such user input, and determine whether the provided input is sufficient for the action and/or circumstances within the app at the time of user input. For example, the app may be configured to only accept user credentials input if the user credential input is longer than a predetermined number of characters. If the input is determined to be insufficient, the client may indicate to the user to provide further input, and may wait for the requested user input to be provided. If the input is determined to be sufficient for the app to complete the action for which it requested/is provided the input, the app may incorporate the input into the interactive user experience, and proceed with instructions execution according to the satisfactory user input. In some implementations, the client executing the app may generate, maintain, update and/or store, e.g., 604, data pertaining to the user's interaction with the app (e.g., an app state, an app data structure, a block of memory with data variables, a Flash movie clip, etc.). In some implementations, the client may determine whether to provide data stored on the client for a server, e.g., 606. If the client determines that data should be provided for the server (e.g., 606, option "Yes"), the client may prepare the data for transmission and provide the data, e.g., 607, for the server, for example, via a HTTP(S) POST messages and/or secure SSL connection with the server as discussed previously.

In some implementations, the gaming server may, upon obtaining the user/client data/state, generate queries for environment data, e.g., 608, stored in gaming realm database(s), pertaining to the user and the co-users who are included in the game/realm in which the user is playing. The gaming realm database may provide, e.g., 609, the requested gaming environment data. For example, the gaming realm database may provide environment data including, but not limited to, user session state(s), such as the exemplary illustrative JSON-encoded user session state data structures provided in the examples above. The server may utilize the environment data for the user(s) provided by the gaming realm database, as well as the user's gaming input, to compute, e.g., 610, an updated user session state for the client (e.g., representing change of the state of the game, actions of the game player/co-player(s) within the game, etc.). Upon completion of the computation, the server may generate load statistics for servicing the user request, e.g., 611. For example, the server may again obtain a snapshot of its computational and/or other load metrics, e.g., using PHP commands similar to those described previously. The server may use the "before-computation" and "after-computation" load snapshots to determine load metrics pertaining to servicing the user's request, e.g., 612. For example, the server may subtract the "before-computation" load metrics from the "after-computation" load metrics to determine the portion of the load metrics applicable to servicing a particular user request. The server may provide the overall "after-computation" load metrics, as well as the load metrics for the particular user to the server load database, e.g., 614.

In some implementations, the server may provide the computed updated user session state for the client. For example, the server may provide, e.g., 615, the render data (e.g., an XML-encoded SVG data file) via one or more HTTP(S) POST messages and/or using an SSL connection with the client, e.g., as illustrated in examples provided above in this disclosure. Upon obtaining the render data, the client may render, e.g., 616, the visualization represented in the data structure for display to the user, e.g., 617.

FIG. 7 is of a logic flow diagram illustrating exemplary aspects of termination of a user application session with the OGM in some embodiments of the OGM, e.g., a user session termination ("UST") component 700. In some implementations, the user may wish to terminate, e.g., 701, the session with the server. For example, the user may close the application, log off from the connection, stay dormant for a period of time, etc. The client may, in such situations, generate a notification to leave the multi-user network application, and provide the notification to the server, e.g., 702. Upon obtaining the notification, e.g., 703, the server may identify a session associated with the user, e.g., by issuing PHP/SQL commands to the server load database to identify a session based on the user ID of the user. Upon identifying the session, the server may issue a query to the server load database, e.g. 704, for example using PHP/SQL commands, to delete the record of the session from the database. The server may also terminate the session by ending listening to the port to which the client was instructed to send user requests. The server load database may, upon obtaining the termination order from the gaming server, update, e.g., 705, its records by deleting the record of the session for the user.

FIGS. 8A-B are of logic flow diagrams illustrating exemplary aspects of processing a user-initiated server load balancing request in some embodiments of the OGM, e.g., a user-initiated load balancing request ("UI-LBR") component 800. In some implementations, a user utilizing an app running on a client may be experiencing a slow app experience, and may request, e.g., 801, the OGM to attempt improving the app experience. For example, the user may click on a hyperlink within the app that results in generation of a user-initiated load-balancing request. In response, the client may provide a load balancing request on behalf of the user to the OGM, e.g., to the load-balancing server. For example, a browser application executing on the client and hosting the app may provide a HTTP(S) POST message including XML-encoded load balancing request data, similar to the example listing provided below:

```
POST /loadbalance.php HTTP/1.1
Host: www.appserver.com
Content-Type: Application/XML
Content-Length: 279
<?XML version = "1.0" encoding = "UTF-8"?>
<load_balance_request>
    <request_id>THVU37</request_id>
    <requestor_type>user</requestor_type>
    <requestor_id>username@appserver.com<requestor_id>
    <server_id>gs1.appserver.com<server_id>
    <timestamp>2010-05-23 21:34:23</timestamp>
</load_balance_request>
```

The load balancing server may obtain, e.g., 802, the request from the client, and parse the XML-encoded request to obtain the load balancing request data. For example, the load balancing server may utilize PHP commands similar to the exemplary listing provided below:

```
<?PHP
$p = xml_parser_create( );   // create XML parser
xml_parse_into_struct($p, $xml_data, $values, $index);   // specify
parser type
xml_parser_free($p);         // parse XML data stored in variable
                             $xml_data
?>
```

The load balancing server may obtain an ID or name of the gaming server providing services to the client, and may query, e.g., 803, the server load database for the load data pertaining to that gaming server. For example, the load balancing server may utilize PHP/SQL commands, similar to the examples presented previously, to obtain the load data of the identified gaming server from the server load database. In response, the server load database may provide, e.g., 804, the requested server load data which may include, but not be limited to: a gaming server ID, number of users being serviced, gaming user IDs whose requests were serviced, service begin and end timestamps, memory usage for servicing the user request, CPU usage for servicing the user requests, average response time for servicing the user requests, number of page faults for servicing the user requests, number of swaps for servicing the user requests, and/or the like. The load balancing server may also request, e.g., 805, the server load database for load balancing rules which the load balancing server may utilize to determine whether the load balancing request is a valid request. The server load database may provide, e.g., 806, rules in response to the load balancing server's request. For example, the server load database may return an XML-encoded load balancing rules file similar to the exemplary listing provided below illustrating load balancing rules:

```
<?XML version = "1.0" encoding = "UTF-8"?>
<load_balancing_rule>IF (server_ip = 29.76.238.xxx AND
    (num_users > 5000 OR mem_usage > 90%)) THEN
    (ADD REQUEST)</load_balancing_rule>
<load_balancing_rule>IF (server_ip = 29.76.xxx.xxx AND
    (avg_response_time > 20000 AND mem_usage > 80%)) THEN
    (ADD REQUEST)</load_balancing_rule>
<load_balancing_rule>IF (num_users > 8000 AND
    (NOT (mem_usage < avg_mem_usage)) THEN
    (ADD REQUEST)</load_balancing_rule>
```

The server may obtain the load-balancing rules file from the server load database, and parse, e.g., using PHP commands similar to the example above, the load balancing rules file to obtain the load balancing rules. The load balancing server may apply the rules to the server load data to determine, e.g., 807, whether the load balancing request is valid. For example, the load balancing server may apply each load balancing rule to the server load data, and determine whether any of the rule outcomes requires that the user's request be serviced. If any rule produces such an outcome, the load balancing server may determine that the load balancing request is valid. In some implementations, the load balancing server may determine a priority level for the load balancing request based on whether the request was submitted by the user (as opposed to a server and/or other OGM component), the number of load balancing rules that produced an outcome requiring the user's request to be serviced, a time of submission of the load balancing request, etc. If no load balancing rule produces an outcome that requires the load balancing request to be serviced (e.g., 808, Option "No"), the load balancing server may generate a request denied message (e.g., as a HTTP(S) POST message) for the user/client, and may provide troubleshooting routines, e.g., 809, which the user/client may utilize, e.g., 810, to identify and solve the problem. However, if the load balancing server determines that the user's load balancing request should be serviced (e.g., 808, Option "Yes"), the load balancing server may assigned the calculated priority value to the user's load balancing request, e.g., 811, and add the user's load balancing request and the priority value to a user-initiated load balancing queue, e.g., 812. For example, the load balancing server may utilize PHP/SQL commands similar to the examples presented previously to add a record including details of the user's load balancing request and priority value(s) to the user-initiated load balancing queue. The load balancing server may also generate an acknowledgment message, e.g., 813, acknowledging that the user's load balancing request has been accepted, and provide, e.g., 814 the message, e.g., as a HTTP(S) POST message, for the user/client.

Figure 9A:
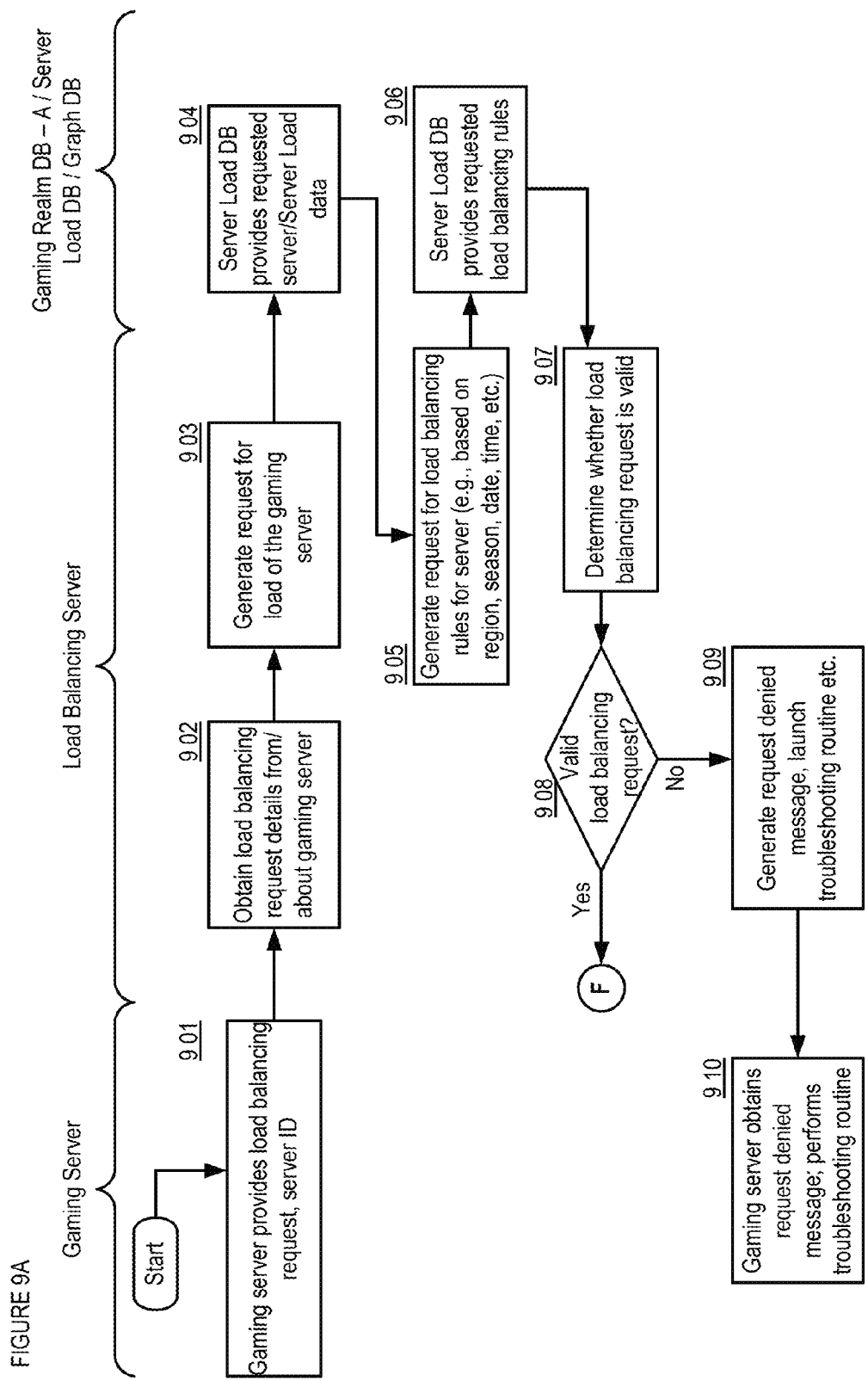
FIGS. 9A-B are of logic flow diagrams illustrating exemplary aspects of processing a gaming server-initiated server load balancing request in some embodiments of the OGM, e.g., a server-initiated load balancing request ("SI-LBR") component.
Figure 9B:
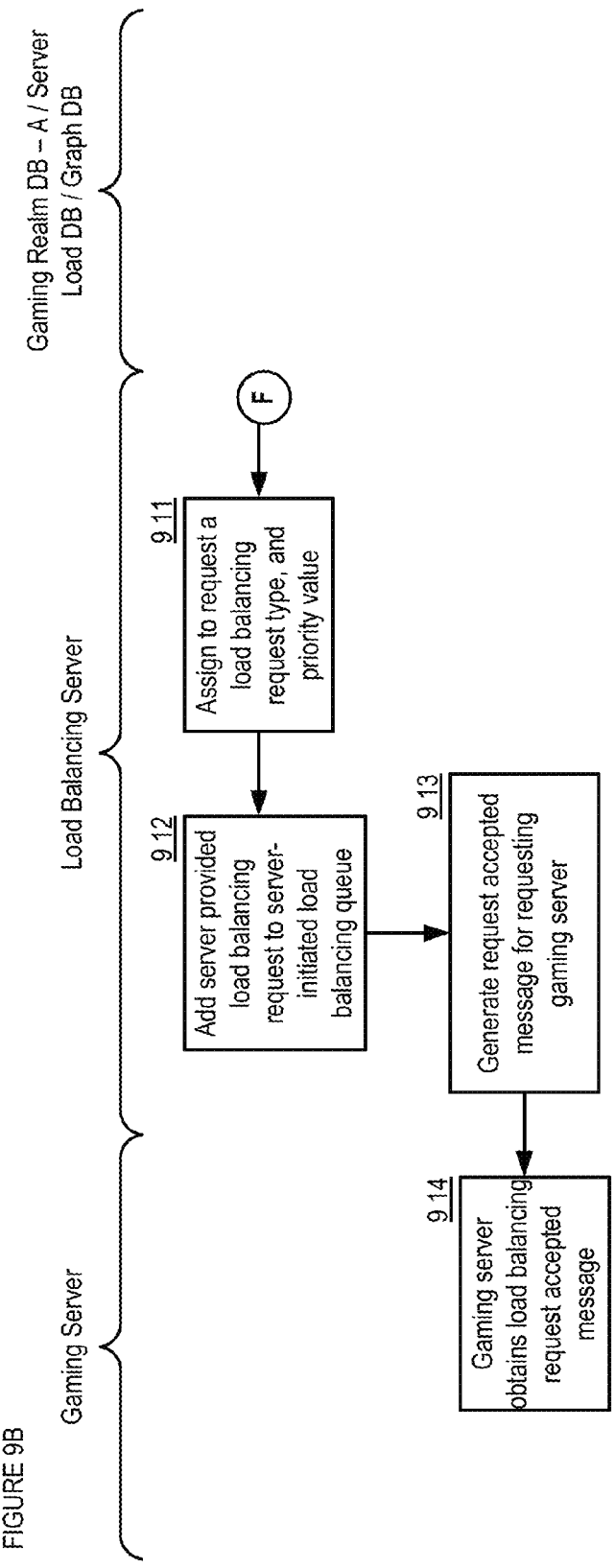

FIGS. 9A-B are of logic flow diagrams illustrating exemplary aspects of processing a gaming server-initiated server load balancing request in some embodiments of the OGM, e.g., a server-initiated load balancing request ("SI-LBR") component 900. In some implementations, a gaming server providing services for user(s)/client(s) may, e.g., be experiencing slow service request response times and/or other adverse performance metrics, and may request, e.g., 901, the OGM to attempt improving its performance. In some implementations, a gaming server may recognize another slow gaming server within the OGM, and may submit a load balancing request on behalf of the slow gaming server. For example, a gaming server may provide a load balancing request to the OGM, e.g., to the load-balancing server. For example, the gaming server may provide a HTTP(S) POST message including XML-encoded load balancing request data, similar to the example listing provided below:

```
POST /loadbalance.php HTTP/1.1
Host: www.appserver.com
Content-Type: Application/XML
Content-Length: 279
<?XML version = "1.0" encoding = "UTF-8"?>
<load_balance_request>
    <request_id>CGH382</request_id>
    <requestor_type>server</requestor_type>
    <requestor_id>gs1.appserver.com<requestor_id>
    <server_id>gs1.appserver.com<server_id>
    <timestamp>2010-05-24 22:14:53</timestamp>
</load_balance_request>
```

The load balancing server may obtain, e.g., 902, the request from the gaming server, and parse the XML-encoded request to obtain the load balancing request data. For example, the load balancing server may utilize PHP commands similar to the listing provided in the example above. The load balancing server may obtain an ID or name of the gaming server for which load balancing is requested, and may query, e.g., 903, the server load database for the load data pertaining to that gaming server. For example, the load balancing server may utilize PHP/SQL commands, similar to the examples presented previously, to obtain the load data of the identified gaming server from the server load database. In response, the server load database may provide, e.g., 904, the requested server load data which may include, but not be limited to: a gaming server ID, number of users being serviced, gaming user IDs whose requests were serviced, service begin and end timestamps, memory usage for servicing the user request, CPU usage for servicing the user requests, average response time for servicing the user requests, number of page faults for servicing the user requests, number of swaps for servicing the user requests, and/or the like. The load balancing server may also request, e.g., 905, the server load database for load balancing rules which the load balancing server may utilize to determine whether the load balancing request is a valid request. The server load database may provide, e.g., 906, rules in response to the load balancing server's request. For example, the server load database may return an XML-encoded load balancing rules file similar to the exemplary listing provided above illustrating load balancing rules. The server may obtain the load-balancing rules file from the server load database, and parse, e.g., using PHP commands similar to the example above, the load balancing rules file to obtain the load balancing rules. The load balancing server may apply the rules to the server load data to determine, e.g., 907, whether the load balancing request is valid. For example, the load balancing server may apply each load balancing rule to the server load data, and determine whether any of the rule outcomes requires that the gaming server-initiated load balancing request be serviced. If any rule produces such an outcome, the load balancing server may determine that the load balancing request is valid. In some implementations, the load balancing server may determine a priority level for the load balancing request based on whether the request was submitted by the server (as opposed to another server, a user and/or other OGM component), the number of load balancing rules that produced an outcome requiring the gaming server-initiated load balancing request to be serviced, a time of submission of the load balancing request, etc. If no load balancing rule produces an outcome that requires the load balancing request to be serviced (e.g., 908, Option "No"), the load balancing server may generate a request denied message (e.g., as a HTTP(S) POST message) for the gaming server, and may provide troubleshooting routines, e.g., 909, which the gaming server may utilize, e.g., 810, to identify and solve the problem. However, if the load balancing server determines that the gaming server-initiated load balancing request should be serviced (e.g., 908, Option "Yes"), the load balancing server may assigned the calculated priority value to the gaming server-initiated load balancing request, e.g., 911, and add the gaming server-initiated load balancing request and the priority value to a server-initiated load balancing queue, e.g., 912. For example, the load balancing server may utilize PHP/SQL commands similar to the examples presented previously to add a record including details of the gaming server-initiated load balancing request and priority value(s) to the server-initiated load balancing queue. The load balancing server may also generate an acknowledgment message, e.g., 913, acknowledging that the gaming server-initiated load balancing request has been accepted, and provide, e.g., 914 the message, e.g., as a HTTP(S) POST message, for the gaming server(s).

Figure 10:
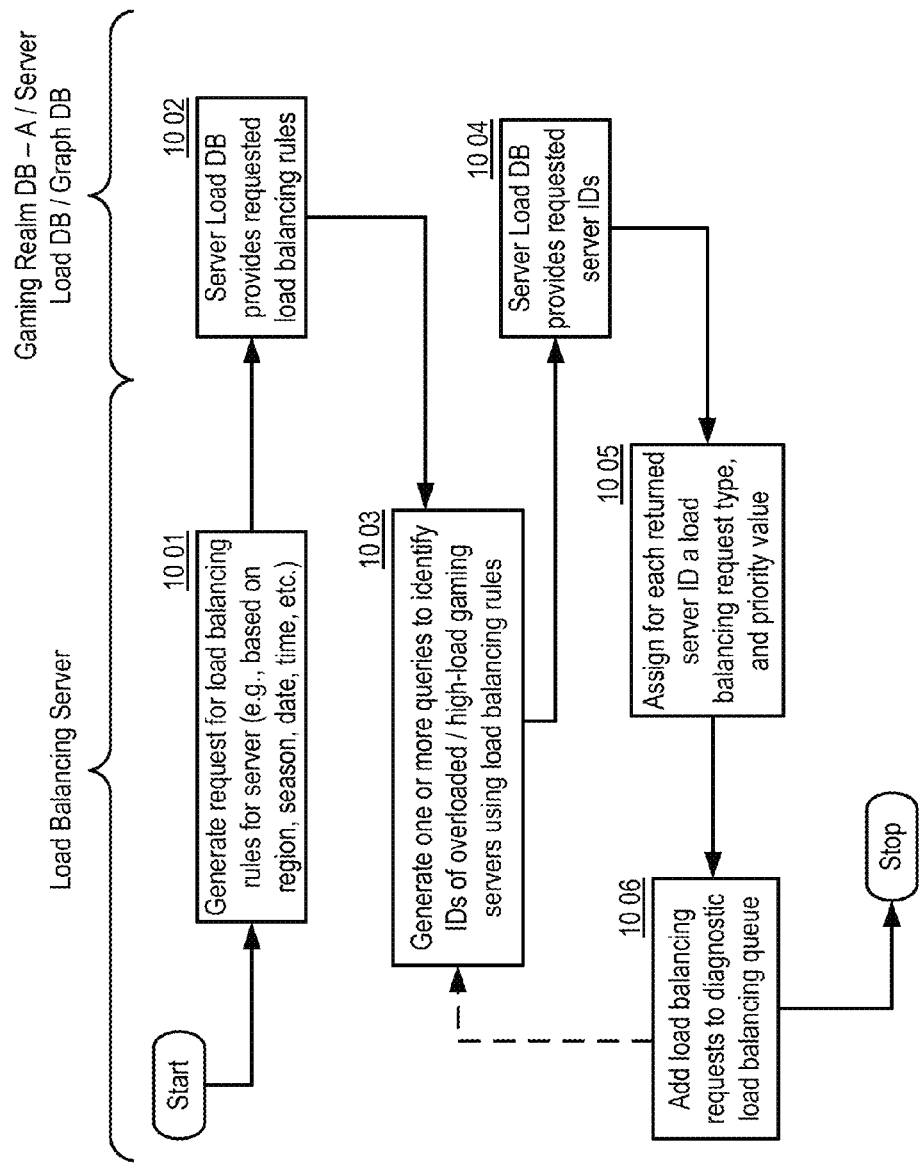
FIG. 10 is of a logic flow diagram illustrating exemplary aspects of processing a self-diagnostic server load balancing request in some embodiments of the OGM, e.g., a diagnostic load balancing request ("D-LBR") component.

FIG. 10 is of a logic flow diagram illustrating exemplary aspects of processing a self-diagnostic server load balancing request in some embodiments of the OGM, e.g., a diagnostic load balancing request ("D-LBR") component 1000. In some implementations, the load balancing server may identify gaming servers that require load balancing by performing targeted searches through the server load database for overburdened gaming servers using performance metrics as search terms. For example, the load balancing server may request, e.g., 1001, the server load database for load balancing rules which the load balancing server may utilize to identify overburdened gaming servers. The server load database may provide, e.g., 1002, rules in response to the load balancing server's request. For example, the server load database may return an XML-encoded load balancing rules file similar to the exemplary listing provided above illustrating load balancing rules. The server may obtain the load-balancing rules file from the server load database, and parse, e.g., using PHP commands similar to the example above, the load balancing rules file to obtain the load balancing rules. The load balancing server may then use the rules to generate, e.g., 1003, one or more queries for gaming servers whose load data satisfy the conditions included in the rules. For example, if a rule requires that a gaming server be load-balanced if it is servicing more than 5000 users and its CPU usage is greater than 65%, the load balancing server may generate a PHP/SQL query with these values as search result restrictors within the 'num_users' and 'cpu_usage' columns of the server load database. In some implementations, the load balancing server may generate multiple queries to the server load database, obtain IDs of gaming servers as part of the results of these queries, e.g., 1004, and then, e.g., obtain IDs of gaming servers to be load-balanced as an intersection of the search results from the multiple search queries. The load balancing server may generate a load-balancing request for each gaming server thus diagnostically identified as requiring load balancing, and assign a priority value (e.g., based on the number of server load database search results in which the gaming server ID appeared) to each diagnostically-identified load balancing request, e.g., 1005. The load balancing server may then add the diagnostically-identified load balancing requests and their priority values to a diagnostic load balancing queue, e.g., 1006. For example, the load balancing server may utilize PHP/SQL commands similar to the examples presented previously to add a record including details of the diagnostically-identified load balancing request(s) and priority value(s) to the diagnostic load balancing queue.

Figure 11:
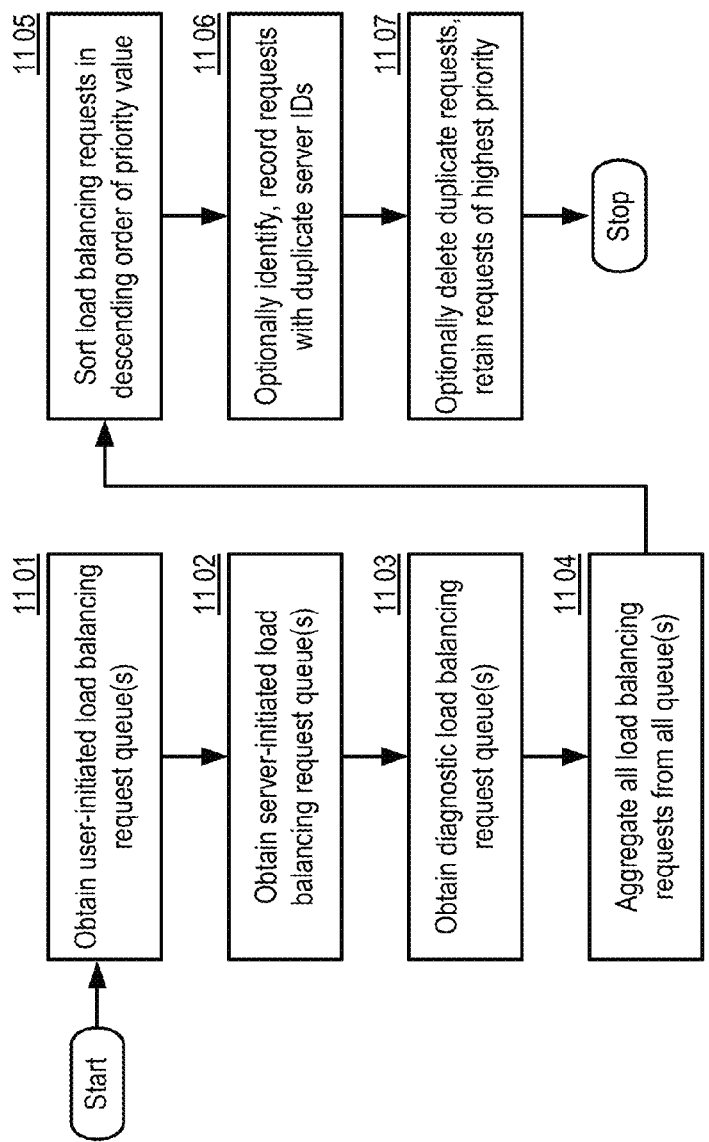
FIG. 11 is of a logic flow diagram illustrating exemplary aspects of processing server load balancing requests initiated by various OGM components and/or affiliated entities in some embodiments of the OGM, e.g., a load-balancing request aggregator ("LBRA") component.

FIG. 11 is of a logic flow diagram illustrating exemplary aspects of processing server load balancing requests initiated by various OGM components and/or affiliated entities in some embodiments of the OGM, e.g., a load-balancing request aggregator ("LBRA") component 1100. In some implementations, the load balancing server may obtain gaming servers identified as requiring load balancing from the user-initiated load balancing request queue, e.g., 1101, the server-initiated load balancing request queue, e.g., 1102, and the diagnostic load balancing request queue, e.g., 1103. The load balancing server may aggregate, e.g., 1104, the requests from these sources into a master queue of gaming server IDs that require load balancing. The load balancing server may assign each of the user-initiated, server-initiated, and diagnostic load balancing queues with a relative weight. The load balancing server may then calculate an overall priority value for each request in the master queue, using its priority value obtained from the queue from which it was obtained, as well as the priority value of the queue itself. The load balancing server may sort the requests in the master queue in descending order of the overall priority value. In some implementations, the load balancing server may, e.g., 1106, optionally, identify gaming servers that have duplicate requests in the master queue, and record the requests in a database (e.g., the server load database). In some implementations, the load balancing server may, e.g., 1107, optionally delete the duplicate requests from the master queue.

Figure 12:
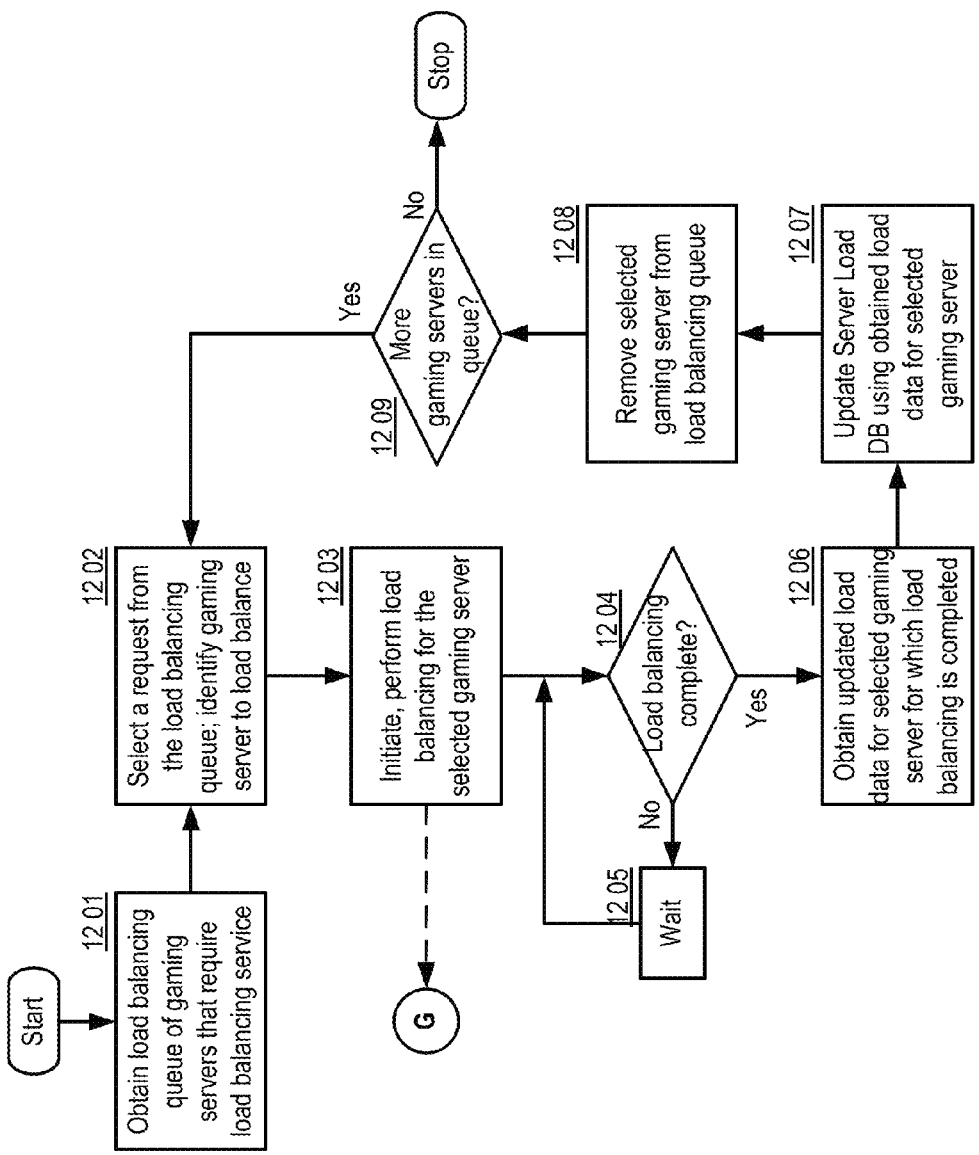
FIG. 12 is of a logic flow diagram illustrating exemplary aspects of processing server load balancing requests based on a user's social graph and online behavior in some embodiments of the OGM, e.g., a server load balancing ("SLB") component.

FIG. 12 is of a logic flow diagram illustrating exemplary aspects of processing server load balancing requests based on a user's social graph and online behavior in some embodiments of the OGM, e.g., a server load balancing ("SLB") component 1200. In some implementations, the OGM may obtain a load balancing queue (e.g., the master queue as discussed above with reference to FIG. 11) of gaming servers that require load balancing, e.g., 1201. The OGM may, in some implementations, serially process the load balancing requests stored in the load balancing queue. For example, the OGM may select a request from the load balancing queue. For example, the load balancing server may issue PHP/SQL commands described previously to retrieve a record having highest priority from the load balancing queue. The load balancing server may parse the record to identify a gaming server for which load balancing needs to be performed, e.g., 1202. The OGM may initiate, and perform load balancing, e.g., 1203, for the identified gaming server, as discussed further below with reference to FIG. 13. The OGM may wait (e.g., 1204, Option "No") until the load balancing of the gaming server is complete (e.g., 1204, Option "Yes"). Upon obtaining an indication that the load balancing of the gaming server is complete, the OGM may obtain updated load data for the gaming server for which load balancing has been completed, e.g., 1206. For example, the gaming server may issue PHP commands such as those discussed above to obtain performance metrics (e.g., memory usage, CPU usage, number of page faults, number of default swaps, etc.), and may provide the load data to the server load database, e.g., 1207, for example, via PHP/SQL commands to write/edit a record in the server load database. Once the gaming server load balancing is complete (and, in some implementations, the server load database has been updated with the new server load data), the OGM may delete the request pertaining to load balancing for the gaming server from the load balancing queue, e.g., 1208. If there are any more requests in the load balancing queue (e.g., 1209, Option "Yes"), the OGM may repeat the above procedure, until there are no more requests left in the load balancing queue (e.g., 1209, Option "No').

Figure 13:
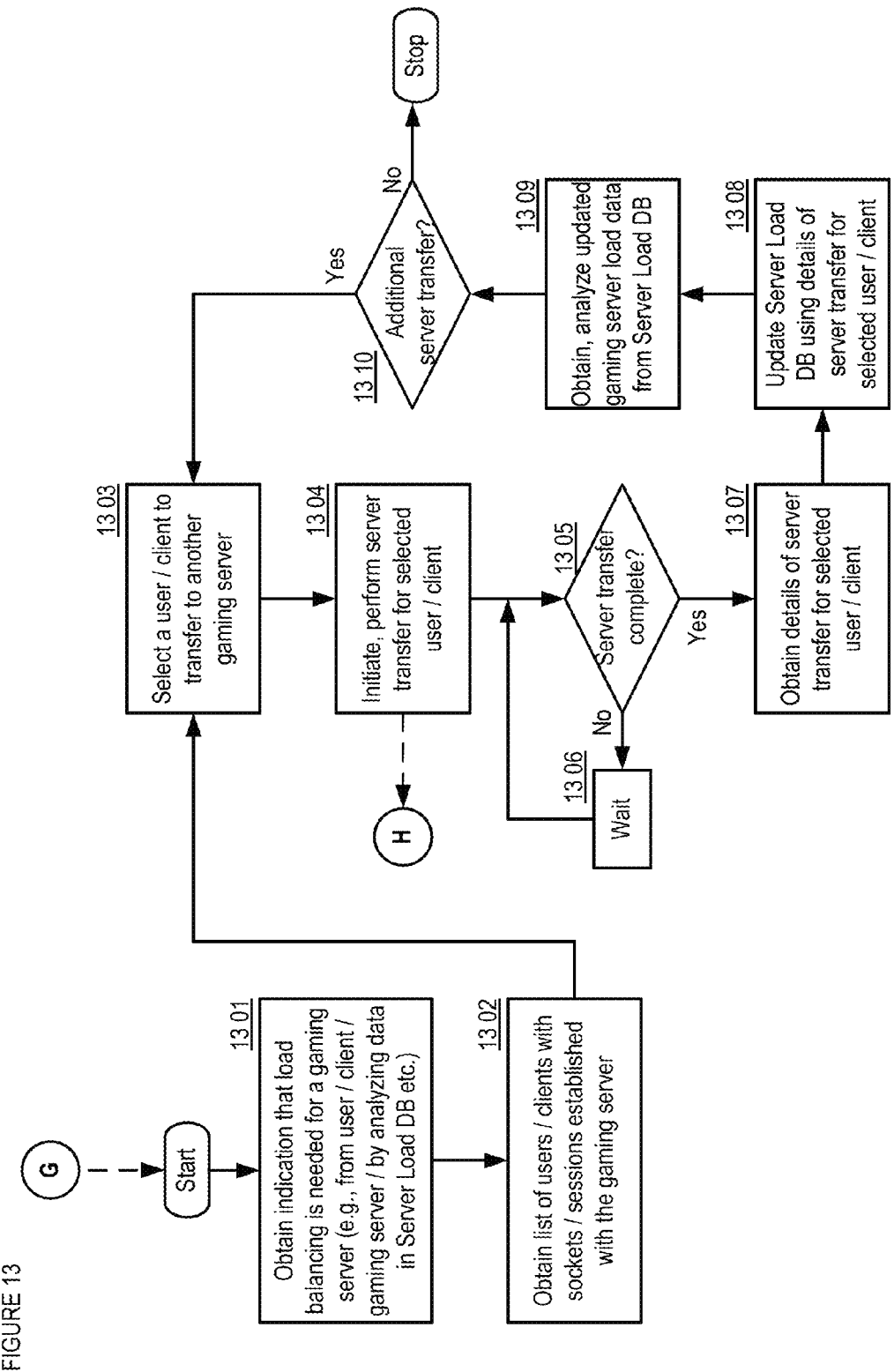
FIG. 13 is of a logic flow diagram illustrating exemplary aspects of transferring users of a gaming server to other gaming servers based on a user's social graph and online behavior in some embodiments of the OGM, e.g., a user gaming server transfer ("UGST") component.

FIG. 13 is of a logic flow diagram illustrating exemplary aspects of transferring users of a gaming server to other gaming servers based on a user's social graph and online behavior in some embodiments of the OGM, e.g., a user gaming server transfer ("UGST") component 1300. In some implementations, the OGM may obtain an indication that a gaming server requires load balancing, e.g., 1301. The OGM may obtain a list of users/clients with gaming sessions (e.g., as established using User Session Initiation component 500) established with the gaming server, e.g., 1302, to perform user migration/transfer to other gaming servers, as part of load balancing for the identified gaming server. For example, the load balancing server may query the server load database for a list of users who have sessions established with the identified gaming server. The OGM may, in some implementations, serially process the user migration of users to other gaming servers for load balancing purposes. For example, the OGM may select, e.g., 1303, a user/client to transfer to another gaming server from the identified gaming server. For example, the load balancing server may issue PHP/SQL commands described previously to retrieve a user ID presenting the highest load on the identified gaming server. In other implementations, the load balancing server may look for duplicate load balancing requests pertaining to the identified gaming server that have been initiated by users, and select from one of the users who provided the load balancing request(s) for migration. Upon selecting a user for migration, the OGM may initiate and perform the gaming server transfer for the selected user/client, e.g., 1304, as discussed further below with reference to FIG. 14. The OGM may wait (e.g., 1305, Option "No") until the transfer of the selected user to another gaming server is complete (e.g., 1305, Option "Yes"). Upon obtaining an indication that the user migration to another gaming server is complete, the OGM may obtain updated load data for the gaming servers from and to which the user was transferred, e.g., 1307. For example, the gaming server may issue PHP commands such as those discussed above to obtain performance metrics (e.g., memory usage, CPU usage, number of page faults, number of default swaps, etc.), and may provide the load data for the gaming servers to the server load database, e.g., 1308, for example, via PHP/SQL commands to write/edit record(s) in the server load database. Once the user migration is complete and the server load database has been updated with the new server load data, the OGM may analyze the updated gaming server load data, e.g., 1309, to determine whether further user migrations are required. For example, the load balancing server may obtain the load balancing rules from the server load database and apply the rules to the server load data to determine whether any rules produces an outcome requiring load balancing for the gaming server, as discussed previously. If additional server transfers for users are not needed (e.g., 1310, option "No"), then the OGM may end the load balancing procedure for the identified gaming server. If, however, additional server transfer for users are needed (e.g., 1310, option "Yes"), the OGM may repeat the above procedure until the OGM determines that further server transfers for users away from the identified gaming server are not needed.

Figure 14C:
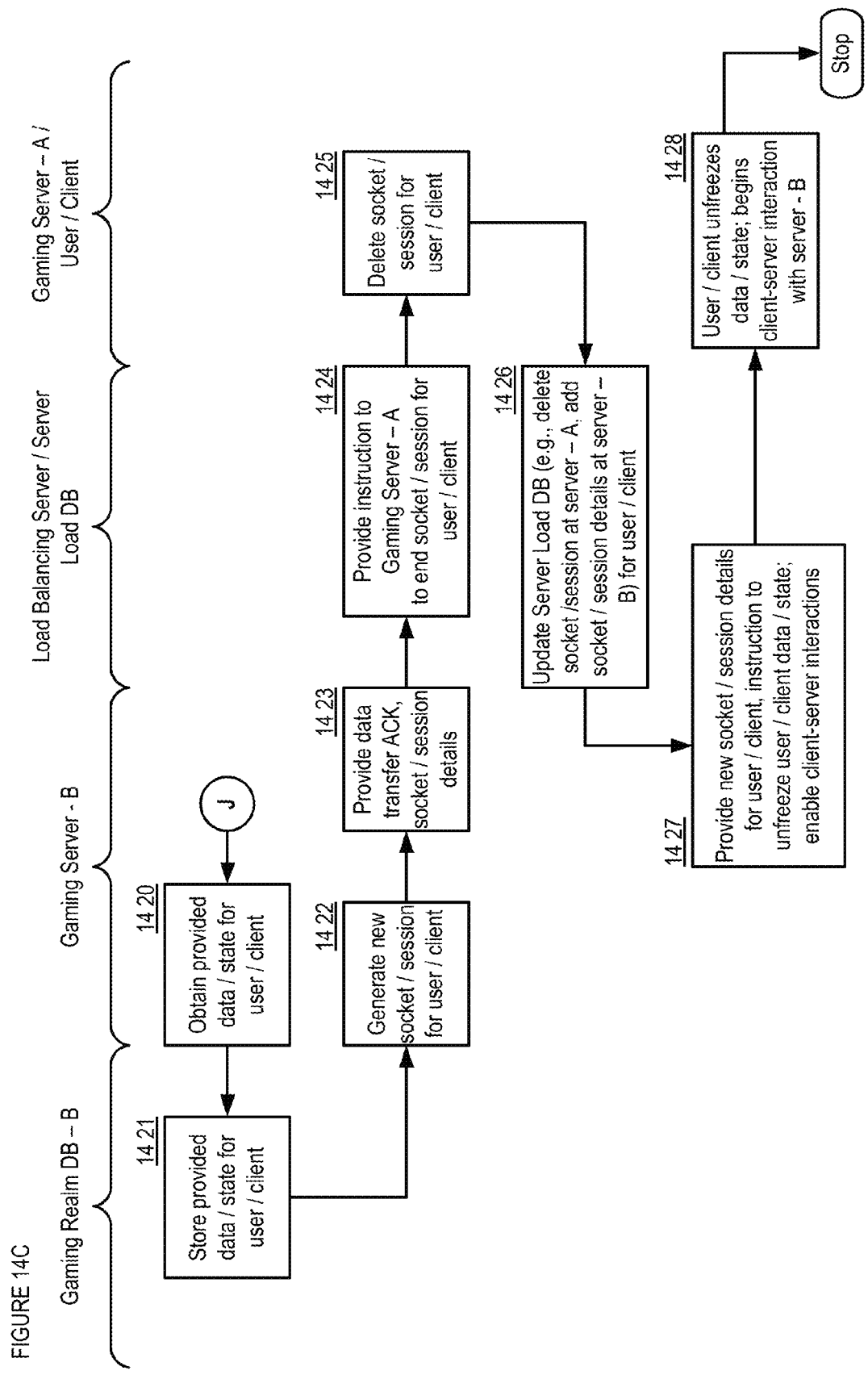

FIGS. 14A-C are of logic flow diagrams illustrating exemplary aspects of migrating a user from one server to another based on a user's social graph and online behavior in some embodiments of the OGM, e.g., a user migration ("UM") component 1400. In some implementations, the OGM may be triggered, e.g., 1401, to migrate a user away from one gaming server to an alternate gaming server within the OGM. The load balancing server may obtain, e.g., 1402, a user ID of the user to be migrated, and the ID of the gaming server away from which the user is to be migrated ("gaming server—A"). The OGM may, in response to the trigger, attempt to determine a transfer server to which to migrate the user using the social relationship and online behavioral data of the user. For example, the load balancing server may query, e.g., 1403, a social graph database for the user's social activity data and/or social graph (e.g., using PHP/SQL commands, via an application programming interface call to a social networking service, etc.), as discussed previously with reference to FIG. 4. In response, the social graph database and/or social networking service may provide, e.g., 1404, user social graph data including, but not limited to: friend IDs, friend relationship strength(s), flags for whether the co-users are gamer friends and/or social networking friends, and/or the like, to the load balancing server, e.g., 1405. In some implementations, the load balancing server may identify co-users using the gaming session state of the user. The load balancing server may request and obtain, e.g., 1406-1408, the user session state from the gaming realm database associated with gaming server—A ("gaming realm database—A"). The load balancing server may identify a game ID of the game being played by the user, and may query the gaming realm database of the OGM for user IDs of other users playing the same game with the user. The load balancing server may aggregate the results for co-users from the queries for the social graph data and from analyzing user IDs in the gaming realm databases to create a list of identified co-users, e.g., 1409, of the user for which server transfer is being performed. The load balancing server may utilize the user IDs of the co-users to generate search queries for candidate transfer servers for the user. For example, the load balancing server may obtain load balancing rules from the server load database, e.g., as discussed previously using PHP/SQL commands issued to the server load database. The load balancing server may then utilize the rules to generate search queries that identify, e.g., 1410, servers that host at least one of the identified co-users and are not overloaded (similar to the discussion previously where the load balancing server identified overloaded gaming servers using targeted search queries. The load balancing server may aggregate the results of the search queries, e.g., 1411, to generate a list of transfer candidate servers to which the OGM may migrate the user. Using the list of identified co-users and the list of transfer candidate servers, the OGM may identify a transfer server ("gaming server—B"), e.g., 1412, to transfer the user, e.g., using the example Server Transfer Selection component 1500 discussed further below with reference to FIG. 15.

Upon identifying the gaming server—B to transfer the user to, the load balancing server may execute a procedure similar to that followed when initiating a new user session, such as described with reference to FIG. 4. For example, the load balancing server may provide a user transfer request, e.g., 1413, to the identified gaming server—B. The gaming server—B may receive the load balancing server's user transfer request, and may provide a user transfer acknowledgment (e.g., 1415, option "Yes") to the load balancing server. If the gaming server—B rejects the transfer of the user, the OGM may repeat the procedure to identify a transfer server to transfer the user to (e.g., 1412). Upon accepting the user transfer, the gaming server—B may generate freeze and/or transfer orders, e.g., 1416, freeze and/or transfer orders to inform the client to temporarily suspend initiation of communication with the gaming servers A and B (e.g., only accept incoming communication from the servers) while the user transfer takes place between the gaming server—A and the gaming server—B, and/or to communicate with the gaming server—B, rather than the gaming server—A, upon resumption of communication. The OGM may then initiate the user transfer from gaming server—A to the gaming server—B. The load balancing server may provide access rights, e.g., 1417, to the gaming server—B to communicate with the gaming server—A and/or the gaming realm database—A associated with gaming server—A. The gaming server—B, e.g., 1418, may provide a request for the user's session state from the gaming realm database—A associated with the gaming server—A, for example, using PHP/SQL commands similar to examples provided above. In response, the gaming realm database—A may provide, e.g., 1419, the request user session state to the gaming server—B, e.g., 1420. The gaming server—B may then store the user session state, e.g., 1421, in its gaming realm database—B. The gaming server—B may then generate, e.g., 1422, a socket connection with the client, e.g., with an Adobe® Flash object running on the client, as illustrated in examples above. The gaming server—B may provide, e.g., 1423 the details of the session with the user to the server load database, e.g., along with a snapshot of its load data taken before and/or after creating the session with the user. The gaming server—B may also provide an acknowledgment that the user transfer was successful and/or provide instructions, e.g., 1424, to the gaming server—A to end its session with the user. Upon receiving the acknowledgment/instructions, the gaming server—A may delete, e.g., 1425, its session with the user and update its gaming realm database, and provide an updated server load data to the server load database, e.g., 1426. The gaming server—B may, e.g., 1427, write freeze and/or transfer orders to the client (e.g., via the socket connection to the Adobe Flash® object using PHP commands similar to examples above). In response, the client may unfreeze the app, e.g., 1428, and resume communication with the server components, e.g., with the gaming server—B. For example, the client may allow the user to provide execute procedures similar to of the example User Gaming Interaction component 600 such as described in FIG. 6.

Figure 15:
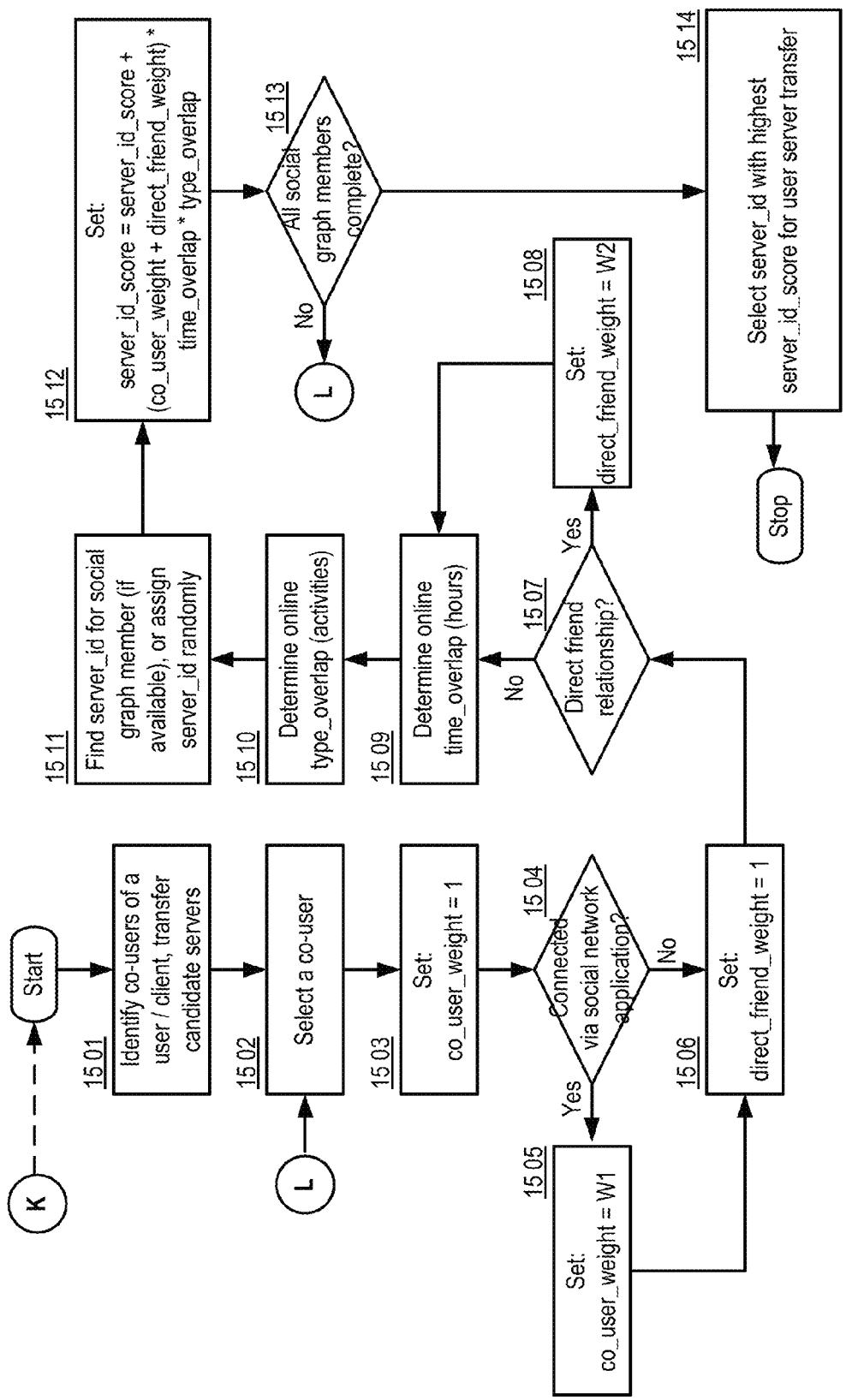
FIG. 15 is of a logic flow diagram illustrating exemplary aspects of selecting a server to which to migrate a user based on the user's social graph and online behavior in some embodiments of the OGM, e.g., a server transfer selection ("STS") component.

FIG. 15 is of a logic flow diagram illustrating exemplary aspects of selecting a server to which to migrate a user based on the user's social graph and online behavior in some embodiments of the OGM, e.g., a server transfer selection ("STS") component 1500. In the some implementations, the OGM and/or its affiliated components (e.g., load balancing server) may obtain, e.g., 1501, a list of co-users of a user to be migrated and a list of candidate transfer servers to which the user may be migrated from a current gaming server of the user. The OGM may calculate transfer candidate server scores for each of the candidate transfer servers, using data on the social relationships of the user and the co-users, as well as the online behavior of the user and the co-users. The OGM may select a co-user, e.g., 1502, and calculate the strength of the co-user's relationship with the migrating user. For example, the initial weight/strength of the co-user's relationship with the user may be set to 1, e.g., 1503, by default. The OGM may determine whether the co-user and the user are connected via a multi-user network application (e.g., are they explicitly defined as friends in the social graph of user associated with a social networking site such as Facebook®?) If the OGM determines that they are connected (e.g., number of nodes between their nodes on social graph is less then, say, 3) on a multi-user network application, then the OGM may increase the weight of the co-user relationship, e.g., in 1501, to value W1. The OGM may assign an additional weight, say W2, if there is a direct friend relationship between the user and the co-user (e.g., 1506-1508).

In some implementations, the OGM may obtain a historical log of their online social behavior (e.g., a 6-month log of their social activities, and their social activity patterns from a social networking site such as Facebook®, Twitter®, etc.) and/or online gaming behavior (e.g., a 4-month log of their gaming activities on online games such as Farmville, Fishville, Mafia Wars, etc.). The OGM may utilize their online behavior to determine, e.g., whether they are online at the same times, and/or whether they enjoy the same activities. In some implementations, the OGM may consider other indications of implicit relationship, common interests, similar online behavior, and/or the like. In some implementations, the OGM may generate a time-activity histogram for each user. For example, the OGM may generate a two-dimensional graph with period of time (e.g., 0-6 months) on the x-axis, and amount of online activity (e.g., number of posts to a social networking sites, number of tweets, average number of keystrokes within an online game, amount of time logged-in to social networking and/or gaming website, etc.) on the y-axis, using the online social and gaming activity patterns of the user and the co-user. The OGM may then calculate a correlation of the time-activity functions of the user and the co-user to determine how well correlated the online activity times of the user and the co-user. For example, using the correlation between the time-activity functions of the user and the co-user, the OGM may calculate an online activity overlap time ("time_overlap") for the user and the co-user, representing the average amount of time in a day that the user and co-user are online simultaneously, e.g., 1509. In some implementations, the OGM may generate a type-activity histogram for each user. For example, the OGM may generate a two-dimensional graph with type of activity (e.g., tweeting, posting on social networking site, playing game 1, playing game 2, etc.) on the x-axis, and amount of online activity (e.g., number of posts to a social networking sites, number of tweets, average number of keystrokes within an online game, amount of time logged-in to social networking and/or gaming website, etc.) on the y-axis, using the online social and gaming activity patterns of the user and the co-user. The OGM may then calculate a correlation of the type-activity functions of the user and the co-user to determine how well correlated the preferences for specific online activities are for the user and the co-user. For example, using the correlation between the type-activity functions of the user and the co-user, the OGM may calculate an online activity preference overlap ("type_overlap") for the user and the co-user, representing a degree to which the user and co-user both prefer the same online social and/or gaming activities, e.g., 1510.

In some implementations, the OGM may select, e.g., 1511 a transfer candidate server from the list of transfer candidate servers, and add to its overall score, a score that is based on parameters such as those calculated above for the user and the co-user. For example, the OGM may select a gaming server that hosts the co-user as the transfer candidate server to whose overall score the calculated score will be added. If the co-user is not a gaming co-user, in some implementations, the OGM may select at random a server from among the transfer candidate servers to which to credit the calculate score. Upon selecting the transfer candidate server to which to credit the score, the OGM may (re)calculate, e.g., 1512, the overall score of the selected transfer candidate server using a score based on the co-user weight, direct friend weight, time overlap, type overlap and/or other like parameters that may be calculated by the OGM. It is to be understood that, although a specific example equation has been provided in FIG. 15, element 1512, for calculating transfer candidate server scores, the transfer candidate server scores may be calculated using any combination of the above-discussed and/or like parameters, which may utilized in any type of (or combination of types of) calculations (e.g., addition, subtraction, multiplication, division, correlation, integration, and/or the like). The OGM may repeat this procedure until all co-users of the user have been accounted for (e.g., 1513, option "No"). The OGM may then select the transfer candidate server with the highest overall score as the server to which the OGM will migrate the user.

OGM Controller

Figure 16:
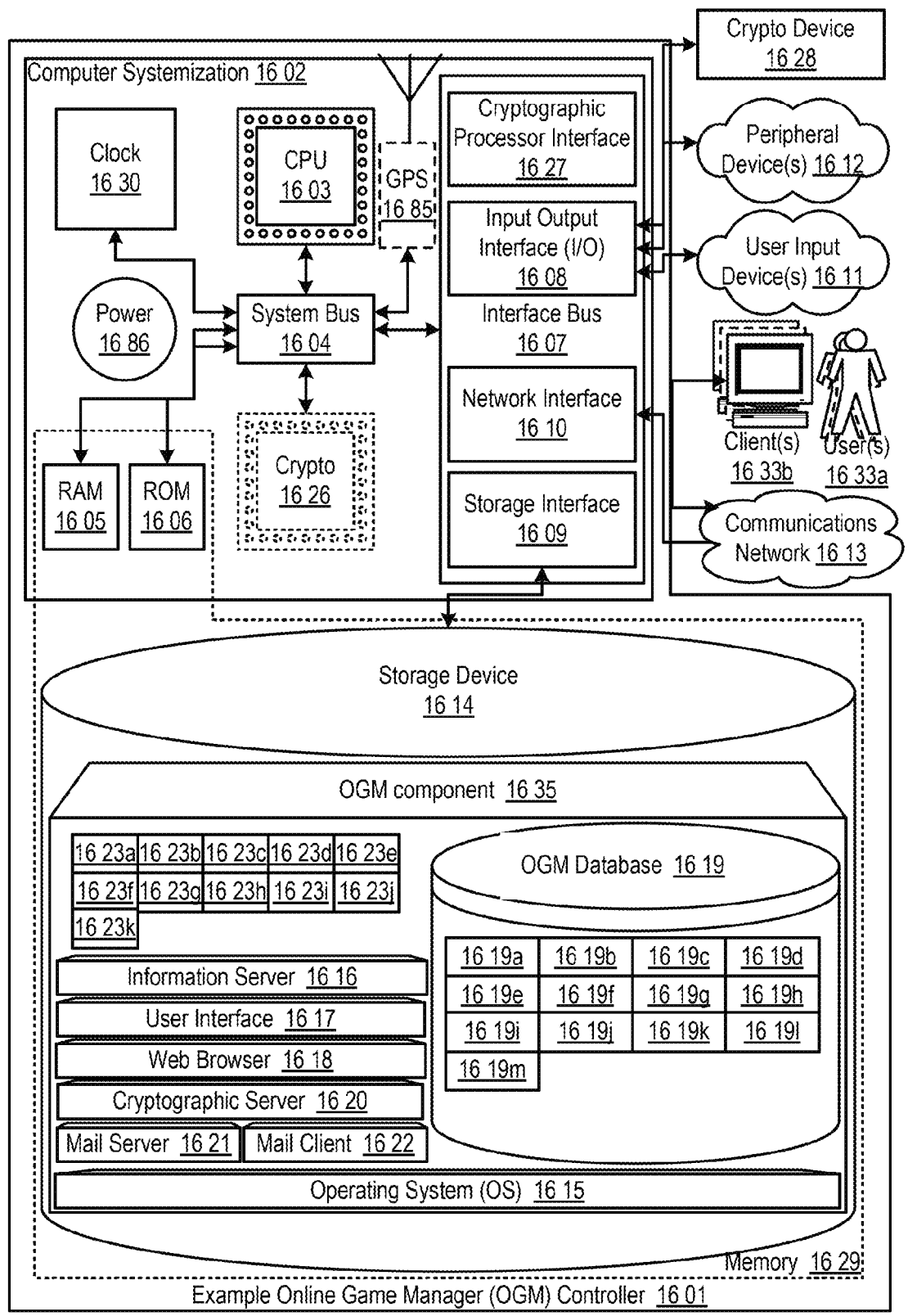
FIG. 16 is of a block diagram illustrating embodiments of the OGM controller.

FIG. 16 illustrates inventive aspects of a OGM controller 1601 in a block diagram. In this embodiment, the OGM controller 1601 may serve to aggregate, process, store, search, serve, identify, instruct, generate, match, and/or facilitate interactions with a computer through enterprise and human resource management technologies, and/or other related data.

Typically, users, which may be people and/or other systems, may engage information technology systems (e.g., computers) to facilitate information processing. In turn, computers employ processors to process information; such processors 1603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the OGM controller 1601 may be connected to and/or communicate with entities such as, but not limited to: one or more users from user client devices 1611; peripheral devices 1612; an optional cryptographic processor device 1628; and/or a communications network 1613. For example, the OGM controller 1601 may be connected to and/or communicate with users operating client device(s) including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™ etc.), eBook reader(s) (e.g., Amazon Kindle™ etc.), laptop computer(s), notebook(s), netbook(s), gaming console(s) (e.g., XBOX Live™, Nintendo® DS etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The OGM controller 1601 may be based on computer systems that may comprise, but are not limited to, components such as: a computer systemization 1602 connected to memory 1629.

Computer Systemization

A computer systemization 1602 may comprise a clock 1630, central processing unit ("CPU(s)" and/or "processor(s)" (these terms are used interchangeable throughout the disclosure unless noted to the contrary)) 1603, a memory 1629 (e.g., a read only memory (ROM) 1606, a random access memory (RAM) 1605, etc.), and/or an interface bus 1607, and most frequently, although not necessarily, are all interconnected and/or communicating through a system bus 1604 on one or more (mother)board(s) 1602 having conductive and/or otherwise transportive circuit pathways through which instructions (e.g., binary encoded signals) may travel to effect communications, operations, storage, etc. Optionally, the computer systemization may be connected to an internal power source 1686. Optionally, a cryptographic processor 1626 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the OGM controller and beyond through various interfaces. Should processing requirements dictate a greater amount speed and/or capacity, distributed processors (e.g., Distributed OGM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the OGM may be achieved by implementing a microcontroller such as CAST's R8051XC2 microcontroller; Intel's MCS 51 (i.e., 8051 microcontroller); and/or the like. Also, to implement certain features of the OGM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the OGM component collection (distributed or otherwise) and/or features may be implemented via the microprocessor and/or via embedded components; e.g., via ASIC, coprocessor, DSP, FPGA, and/or the like. Alternately, some implementations of the OGM may be implemented with embedded components that are configured and used to achieve a variety of features or signal processing.

Depending on the particular implementation, the embedded components may include software solutions, hardware solutions, and/or some combination of both hardware/software solutions. For example, OGM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the OGM features. A hierarchy of programmable interconnects allow logic blocks to be interconnected as needed by the OGM system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the OGM may be developed on regular FPGAs and then migrated into a fixed version that more resembles ASIC implementations. Alternate or coordinating implementations may migrate OGM controller features to a final ASIC instead of or in addition to FPGAs. Depending on the implementation all of the aforementioned embedded components and microprocessors may be considered the "CPU" and/or "processor" for the OGM.

Power Source

The power source 1686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1686 is connected to at least one of the interconnected subsequent components of the OGM thereby providing an electric current to all subsequent components. In one example, the power source 1686 is connected to the system bus component 1604. In an alternative embodiment, an outside power source 1686 is provided through a connection across the I/O 1608 interface. For example, a USB and/or IEEE 1394 connection carries both data and power across the connection and is therefore a suitable source of power.

Interface Adapters

Interface bus(ses) 1607 may accept, connect, and/or communicate to a number of interface adapters, conventionally although not necessarily in the form of adapter cards, such as but not limited to: input output interfaces (I/O) 1608, storage interfaces 1609, network interfaces 1610, and/or the like. Optionally, cryptographic processor interfaces 1627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1609 may accept, communicate, and/or connect to a number of storage devices such as, but not limited to: storage devices 1614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1610 may accept, communicate, and/or connect to a communications network 1613. Through a communications network 1613, the OGM controller is accessible through remote clients 1633b (e.g., computers with web browsers) by users 1633a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed OGM), architectures may similarly be employed to pool, load balance, and/or otherwise increase the communicative bandwidth required by the OGM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1610 may be used to engage with various communications network types 1613. For example, multiple network interfaces may be employed to allow for the communication over broadcast, multicast, and/or unicast networks.

Input Output interfaces (I/O) 1608 may accept, communicate, and/or connect to user input devices 1611, peripheral devices 1612, cryptographic processor devices 1628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1611 may be card readers, dongles, finger print readers, gloves, graphics tablets, joysticks, keyboards, mouse (mice), remote controls, retina readers, trackballs, trackpads, and/or the like.

Peripheral devices 1612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the OGM controller may be embodied as an embedded, dedicated, and/or monitor-less (i.e., headless) device, wherein access would be provided over a network interface connection.

Cryptographic units such as, but not limited to, microcontrollers, processors 1626, interfaces 1627, and/or devices 1628 may be attached, and/or communicate with the OGM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1629. However, memory is a fungible technology and resource, thus, any number of memory embodiments may be employed in lieu of or in concert with one another. It is to be understood that the OGM controller and/or a computer systemization may employ various forms of memory 1629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1629 will include ROM 1606, RAM 1605, and a storage device 1614. A storage device 1614 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1629 may contain a collection of program and/or database components and/or data such as, but not limited to: operating system component(s) 1615 (operating system); information server component(s) 1616 (information server); user interface component(s) 1617 (user interface); Web browser component(s) 1618 (Web browser); database(s) 1619; mail server component(s) 1621; mail client component(s) 1622; cryptographic server component(s) 1620 (cryptographic server); the OGM component(s) 1635; and/or the like (i.e., collectively a component collection). These components may be stored and accessed from the storage devices and/or from storage devices accessible through an interface bus. Although non-conventional program components such as those in the component collection, typically, are stored in a local storage device 1614, they may also be loaded and/or stored in memory such as: peripheral devices, RAM, remote storage facilities through a communications network, ROM, various forms of memory, and/or the like.

Operating System

The operating system component 1615 is an executable program component facilitating the operation of the OGM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the OGM controller to communicate with other entities through a communications network 1613. Various communication protocols may be used by the OGM controller as a subcarrier transport mechanism for interaction, such as, but not limited to: multicast, TCP/IP, UDP, unicast, and/or the like.

Information Server

An information server component 1616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the OGM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the OGM database 1619, operating systems, other program components, user interfaces, Web browsers, and/or the like.

Access to the OGM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the OGM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the OGM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1618 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the OGM enabled nodes. The combined application may be nugatory on systems employing standard Web browsers.

Mail Server

A mail server component 1621 is a stored program component that is executed by a CPU 1603. The mail server may be a conventional Internet mail server such as, but not limited to sendmail, Microsoft Exchange, and/or the like. The mail server may allow for the execution of program components through facilities such as ASP, ActiveX, (ANSI) (Objective–) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the OGM.

Access to the OGM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1622 is a stored program component that is executed by a CPU 1603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1620 is a stored program component that is executed by a CPU 1603, cryptographic processor 1626, cryptographic processor interface 1627, cryptographic processor device 1628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the OGM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource.

In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the OGM component to engage in secure transactions if so desired. The cryptographic component facilitates the secure accessing of resources on the OGM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The OGM Database

The OGM database component 1619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the OGM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the OGM database is implemented as a data-structure, the use of the OGM database 1619 may be integrated into another component such as the OGM component 1635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1619 includes several tables 1619*a-m*. A Users table 1619*a* may include fields such as, but not limited to: user_ID, ssn, first_name, last_name, middle_name, suffix, prefix, address_first_line, address_second_line, city, state, zipcode, country, birth_date, gender, device_ID_list, device_name_list, device_ type_list, hardware_configuration_list, software_apps_list, device_IP_list, device_MAC_list, device_preferences_list, and/or the like. A Servers table 1619b may include fields such as, but not limited to: server_id, server_url, server_ip, server_type, server_user_limit, server_mem_limit, server_cpu_limit, and/or the like. An Apps table 1619c may include fields such as, but not limited to: app_ID, app_name, app_type, app_version, app_version_timestamp, app_prior_versions_list, app_prior_versions_timestamps, app_update_schedule, app_scheduled_versions_list, app_scheduled_versions_dates, app_scheduled_versions_priority, app_enviroment_type, app_envrionment_version, app_compatibilities_hw, app_compatibilities_sw, app_dependent_topology_tree, app_depend_module_list, app_depend_function_list, app_depend_apps_list, and/or the like. A Client table, 1619d, may include fields such as, but not limited to: user_id, user_name, client_id, client_type, language_pref, client_hardware_compatibilities, client_software_installations, session_port, and/or the like. A Queues table 1619e may include fields such as, but not limited to: request_ID, request_fields, request_string, request_origin, request_timestamp, request_priority, request_queue_ID, num_request_attempts, and/or the like. A Server Load table 1619f may include fields such as, but not limited to: server_id, user_id, service_begin_timestamp, service_end_timestamp, mem_usage_user, cpu_usage_user, response_time_user, page_faults_user, num_swaps_user, avg_swaps, avg_page_faults, avg_response_time, avg_mem_usage, avg_cpu_usage, num_users, and/or the like. A User Graph table 1619g may include fields such as, but not limited to: user_id, friend_id, relationship_strength, direct_friend_weight, gamer_friend_weight, co_user_weight, overlap_time, overlap_type, and/or the like. An Online Activity table 1619h may include fields such as, but not limited to: user_id, friend_id, activity_type, activity_timestamp, activity_priority, activity_frequency, overlap_time, overlap_type, and/or the like. A Gaming Realm table 1619i may include fields such as, but not limited to: app_id, app_name, game_id, player_id, player_name, md5_auth, player_action, player_action_timestamp, card_type, card_value, player_action_type, player_action_amount, player_action_source, and/or the like. A Load Balancing Request table 1619j may include fields such as, but not limited to: request_id, requestor_type, requestor_id, server_id, request_timestamp, request_priority, and/or the like. A Load Balancing Rules table 1619k may include fields such as, but not limited to: inputs_list, inputs_values, condition_type, condition_string, condition_outputs, output_ flags, condition_thresholds, and/or the like. An Online Activity table 1619l may include fields such as, but not limited to: log_period, activity_type, activity_timestamp, activity_priority, activity_frequency, time_histogram, type_histogram, and/or the like. A Transfer Server Scoring table 1619m may include fields such as, but not limited to: scoring_rules_list, scoring_formula, scoring_parameters, scoring_outputs, server_id, and/or the like. One or more of the tables discussed above may support and/or track multiple entity accounts on a OGM.

In one embodiment, the OGM database may interact with other database systems. For example, employing a distributed database system, queries and data access by search OGM component may treat the combination of the OGM database, an integrated data security layer database as a single database entity.

In one embodiment, user programs may contain various user interface primitives, which may serve to update the OGM. Also, various accounts may require custom database tables depending upon the environments and the types of clients the OGM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1619a-m. The OGM may be configured to keep track of various settings, inputs, and parameters via database controllers.

The OGM database may communicate to and/or with other components in a component collection, including itself, and/or facilities of the like. Most frequently, the OGM database communicates with the OGM component, other program components, and/or the like. The database may contain, retain, and provide information regarding other nodes and data.

The OGMs

The OGM component 1635 is a stored program component that is executed by a CPU. In one embodiment, the OGM component incorporates any and/or all combinations of the aspects of the OGM discussed in the previous figures. As such, the OGM affects accessing, obtaining and the provision of information, services, transactions, and/or the like across various communications networks.

The OGM component may transform user social graph and online behavioral pattern data inputs via various components into optimized server computational load reports, and/or the like and use of the OGM. In one embodiment, the OGM component 1635 takes inputs (e.g., user input 421, graph data 424, server loads 423, gaming app 430, user input 435, environment data 437, graph data 446, user input 466, environment data 468, and/or the like) etc., and transforms the inputs via various components (e.g., USI 1623a, UGI 1623b, UST 1623c, UI-LBR 1623d, SI-LBR 1623e, D-LBR 1623f, LBRA 1623g, SLB 1623h, UGST 1623i, UM 1623j, and STS 1623k, and/or the like), into outputs (e.g., gaming app request 422, user session request 426, user session ACK 427, app query 429, user session state 432, gaming app 433, user output 434, user session state 432, game input 436, user session state 439, load stats 440, session state 441, user output 443, server loads 444, user transfer request 448, transfer accept 449, freeze, transfer orders 451, app freeze order 452, session state request 454, user session state 455, user session state 456, user session state 458, transfer ACK 459, session delete order 461, load stats 462, terminate ACK 463, app unfreeze order 464, game input 467, user session state 470, load stats 471, session state 472, user output 474, and/or the like), as shown in FIGS. 4A-15, as well as throughout the specification.

The OGM component enabling access of information between nodes may be developed by employing standard development tools and languages such as, but not limited to: Apache components, Assembly, ActiveX, binary executables, (ANSI) (Objective–) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the OGM server employs a cryptographic server to encrypt and decrypt communications. The OGM component may communicate to and/or with other components in a component collection, including itself, and/or facilities of the like. Most frequently, the OGM component communicates with the OGM database, operating systems, other program components, and/or the like. The OGM may contain, communicate, generate, obtain, and/or provide program component, system, user, and/or data communications, requests, and/or responses.

Distributed OGMs

The structure and/or operation of any of the OGM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques. For example, OGM server(s) and database(s) may all be localized within a single computing terminal. As another example, the OGM components may be localized within one or more entities (e.g., hospitals, pharmaceutical companies etc.) involved in coordinated patient management.

The configuration of the OGM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

In order to address various issues and advance the art, the entirety of this application for APPARATUSES, METHODS AND SYSTEMS FOR AN ONLINE GAME MANAGER (including the Cover Page, Title, Headings, Field, Background, Summary, Brief Description of the Drawings, Detailed Description, Claims, Abstract, Figures, Appendices and/or otherwise) shows, by way of illustration, various embodiments in which the claimed invention(s) may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs of the OGM and/or characteristics of the hardware, software, network framework, monetization model and/or the like, various embodiments of the OGM may be implemented that enable a great deal of flexibility and customization. It is to be understood that, depending on the particular needs of the OGM and/or characteristics of the hardware, software, network framework, monetization model and/or the like, various embodiments of the OGM may be implemented that enable a great deal of flexibility and customization. The instant disclosure discusses example implementations of the OGM within the context of multi-user social Internet applications. However, it is to be understood that the system described herein can be readily configured for a wide range of other applications and/or implementations. For example, implementations of the OGM can be configured to operate within the context of office collaboration, multinational operations management, scientific computational resource management, distributed computing systems, and/or the like. It is to be understood that the OGM may be further adapted to other implementations.

The invention claimed is:

1. A method, comprising:
   receiving a user server migration request for a user having client data and state associated with a game executed by a current server, wherein user social graph data identifies co-users and online activity pattern data associated with the user and the co-users, and server load indices of servers associated with the co-users and server load analysis rules are identified;
   identifying a subset of the servers as non-overloaded transfer candidate servers by analyzing the server load indices using the server load analysis rules and calculating a transfer candidate server score for each of the non-overloaded transfer candidate servers using the user social graph data and the online activity pattern data associated with the user and the co-users;
   selecting, based on the transfer candidate server scores, one of the non-overloaded transfer candidate servers for migrating the user;
   stopping client-server interaction for the game executed by the current server and saving the client data and state of the user associated with the game;
   migrating client data and state associated with the user to the selected non-overloaded transfer candidate server; and
   resuming client-server interaction for the game for execution at the selected non-overloaded transfer candidate server using the client data and state.

2. The method of claim 1, wherein calculating the transfer candidate server scores comprises:
   obtaining a co-user relationship strength score for each co-user associated with one of the non-overloaded transfer candidate servers;
   calculating, for each co-user associated with one of the non-overloaded transfer candidate servers, a co-user online overlap score using the online activity pattern data;
   calculating, for each co-user associated with one of the non-overloaded transfer candidate servers, a co-user weight derived from a product of their co-user online overlap score and their co-user relationship strength score; and
   calculating, for each non-overloaded transfer candidate server, its associated transfer candidate server score as a summation of the co-user weights for each co-user associated with the transfer candidate server.

3. The method of claim 2, wherein the co-user relationship strength scores are included in the user social graph data.

4. The method of claim 2, wherein the co-user relationship strength scores are calculated using the online activity pattern data.

5. The method of claim 4, wherein calculating the co-user relationship strength score for each co-user comprises:
   calculating a co-user activity overlap score for each co-user using the online activity pattern data;
   determining whether the user social graph data includes a relationship strength indicator;
   calculating the co-user relationship strength score using the co-user activity overlap score and the relationship strength indicator, if it is determined that the user social graph data includes the relationship strength indicator; and
   providing the co-user activity overlap score as the co-user relationship strength score, if it is determined that the user social graph data does not include the relationship strength indicator.

6. The method of claim 1, wherein the user server migration request is provided by the user or provided by a server currently storing the data associated with the user.

7. The method of claim 1, further comprising:
   obtaining a server load index of a current server associated with the user;
   analyzing the server load index of the current server using the server load analysis rules; and
   generating the user server migration request based on analyzing the server load index of the current server.

8. A system, comprising:
   a memory; and
   a processor disposed in communication with the memory and configured to issue processing instructions stored in the memory, wherein the processor executes instructions
   receive a user server migration request for a user, and in response to the request further process user social graph data identifying co-users, and online activity pattern data associated with the user and the co-users, and process server load indices of servers associated with the co-users, and server load analysis rules;
   identify a subset of the servers as non-overloaded transfer candidate servers by analyzing the server load indices using the server load analysis rules;
   calculate a transfer candidate server score for each of the non-overloaded transfer candidate servers using the user social graph data and the online activity pattern data associated with the user and the co-users;

select, based on the transfer candidate server scores, one of the non-overloaded transfer candidate servers for migrating the user; and migrate data associated with the user to the selected non-overloaded transfer candidate server.

9. The system of claim 8, wherein the instructions to calculate the transfer candidate server scores comprise instructions to:

obtain a co-user relationship strength score for each co-user associated with one of the non-overloaded transfer candidate servers;

calculate, for each co-user associated with one of the non-overloaded transfer candidate servers, a co-user online overlap score using the online activity pattern data;

calculate, for each co-user associated with one of the non-overloaded transfer candidate servers, a co-user weight derived from a product of their co-user online overlap score and their co-user relationship strength score; and calculate, for each non-overloaded transfer candidate server, its associated transfer candidate server score as a summation of the co-user weights for each co-user associated with the transfer candidate server.

10. The system of claim 8, wherein the co-user relationship strength scores are included in the user social graph data.

11. The system of claim 8, wherein the co-user relationship strength scores are calculated using the online activity pattern data.

12. The system of claim 11, wherein the instructions to calculate the co-user relationship strength score for each co-user comprise instructions to:

calculate a co-user activity overlap score for each co-user using the online activity pattern data;

determine whether the user social graph data includes a relationship strength indicator;

calculate the co-user relationship strength score using the co-user activity overlap score and the relationship strength indicator, if it is determined that the user social graph data includes the relationship strength indicator; and provide the co-user activity overlap score as the co-user relationship strength score, if it is determined that the user social graph data does not include the relationship strength indicator.

13. The system of claim 8, wherein the user server migration request is provided by the user.

14. The system of claim 8, wherein the user server migration request is provided by a server currently storing the data associated with the user.

15. The system of claim 8, wherein the processor further issues instructions to:

obtain a server load index of a current server associated with the user;

analyze the server load index of the current server using the server load analysis rules; and generate the user server migration request based on analyzing the server load index of the current server.

16. A method, comprising:

receiving a server migration request for a user having client data and state associated with a game executed by a current server, wherein user social graph data identifies co-users and online activity pattern data associated with the user and the co-users;

calculating a transfer candidate server score to identify non-overloaded transfer candidate servers using the user social graph data and the online activity pattern data associated with the user and the co-users;

stopping client-server interaction for the game executed by the current server and saving the client data and state of the user associated with the game;

migrating client data and state associated with the user to a selected non-overloaded transfer candidate server; and resuming client-server interaction for the game for execution at the selected non-overloaded transfer candidate server using the client data and state, wherein the method is executed by a processor.

17. The method of claim 15, wherein calculating the transfer candidate server scores includes obtain a co-user relationship strength score for each co-user associated with one of the non-overloaded transfer candidate servers.

18. The method of claim 16, wherein the co-user relationship strength scores are included in the user social graph data.

19. The method of claim 16, wherein the co-user relationship strength scores are calculated using the online activity pattern data.

* * * * *